US008368762B1

United States Patent
Chen et al.

(10) Patent No.: US 8,368,762 B1
(45) Date of Patent: Feb. 5, 2013

(54) METHODS AND APPARATUS FOR CAMERA CALIBRATION BASED ON MULTIVIEW IMAGE GEOMETRY

(75) Inventors: Simon Chen, San Jose, CA (US); Hailin Jin, San Jose, CA (US); Jen-Chan Chien, Saratoga, CA (US); Daniel R. Goldman, Seattle, WA (US)

(73) Assignee: Adobe Systems Incorporated, San Jose, CA (US)

( * ) Notice: Subject to any disclaimer, the term of this patent is extended or adjusted under 35 U.S.C. 154(b) by 338 days.

(21) Appl. No.: 12/758,655

(22) Filed: Apr. 12, 2010

(51) Int. Cl.
*H04N 17/00* (2006.01)

(52) U.S. Cl. ........................................ 348/188; 348/187

(58) Field of Classification Search .......... 348/187–188, 348/175, 176
See application file for complete search history.

(56) References Cited

U.S. PATENT DOCUMENTS

2004/0066454 A1* 4/2004 Otani et al. .................... 348/188
2004/0155970 A1* 8/2004 Johannesson et al. ..... 348/231.6

OTHER PUBLICATIONS

Dan B Goldman, "Vignette and Exposure Calibration and Compensation". IEEE Transactions on Pattern Analysis and Machine Intelligence (PAMI), Feb. 25, 2010.
Goldman, D.B., Chen, J.H., 2005. "Vignette and Exposure Calibration and Compensation". IEEE Conference on Computer Vision (ICCV) '05, vol. 1.
Seon Joo Kim, Marc Pollefeys, "Robust Radiometric Calibration and Vignetting Correction". IEEE Transactions on Pattern Analysis and Machine Intelligence (PAMI), 30(4):562-576, 2008.
Zhang, Z., 1999. "Flexible Camera Calibration by Viewing a Plane From Unknown Orientations". IEEE Conference on Computer Vision (ICCV) '99.
R. Hartley. "Self-calibration from multiple views with a rotating camera". In Proc. 3rd European Conference on Computer Vision, pp. 471-478, Stockholm, Sweden, May 1994.
O. D. Faugeras, Q.-T Luong, and S. J. Maybank. "Camera self-calibration: Theory and experiments". In Computer Vision—ECCV '92, LNCS-Series vol. 588, Springer-Verlag, pp. 321-334, 1992.
Y. Y. Schechner and S. K. Nayar. "Generalized mosaicing: High dynamic range in a wide field of view". IJCV, 53 (3):245-267, 2003.
J. Stumpfel, A. Jones, A. Wenger, and P. Debevec. "Direct HDR capture of the sun and sky". In Proc. AfriGraph, pp. 145-149, 2004.
A. Litvinov and Y. Y. Schechner. "Radiometric framework for image mosaicking". Josa A, 22(5):839-848, 2005.
Lucchese, L. [Luca], "Geometric calibration of digital cameras through multi-view rectification". IVC(23), No. 5, May 1, 2005, pp. 517-539.
Joaquim Salvi, Xavier Armangu'e, Joan Bathe, "A comparative review of camera calibrating methods with accuracy evaluation". Pattern Recognition 35 (2002) 1617-1635.
U.S. Appl. No. 12/201,822, filed Aug. 29, 2008.
U.S. Appl. No. 12/201,824, filed Aug. 29, 2008.

*Primary Examiner* — Michael Lee

(57) ABSTRACT

Methods and apparatus for camera calibration based on multiview image geometry. A lens profiling module may estimate two or more mathematical models for correcting aberrations in images in a single pass from a set of calibration images captured with a camera/lens combination. For example, the module may estimate the lens aberrations of geometric distortion, lateral chromatic aberration, and vignette models in a single pass. The module may determine point correspondences, 3D transformations, and camera intrinsics for views of calibration charts captured in the images. The module estimates the mathematical models for the two or more types of aberrations from the information determined from the views of the calibration charts. The module may automatically determine an optimal model complexity when estimating the mathematical models. The estimated models may be written or appended to a lens profile for the camera/lens combination used to captured the calibration images.

20 Claims, 12 Drawing Sheets

METHODS AND APPARATUS FOR CAMERA CALIBRATION BASED ON MULTIVIEW IMAGE GEOMETRY

BACKGROUND

Description of the Related Art

Cameras are light capturing devices. The light begins as rays emanating from some source, such as the sun, and travels through space until striking some object. When that light reaches the object, much spectrum of the light is absorbed, and what is not absorbed is reflected. Some of this reflected light makes its way through the optics of the camera and is collected by the camera sensor (or film) at the image plane. The geometric configuration of the passage of a bundle of light rays from the object through the lens(es) to the image plane can be described mathematically by a parametric model, which may be referred to as the camera model.

The pinhole camera model is a simplistic model in which the bundle of light rays would pass from the object to the image plane through a single perspective center to form a sharp image on the plane of focus according to the fundamental physical laws of the ray optics. In this ideal model, there is no distortion in the images. However, in real world cameras, the camera lens typically involves design compromises and imperfections that may introduce lens aberrations in the captured image. The pinhole camera model is only good as a first order approximation. Deviations from this ideal model (aberrations) may be considered and mathematically modeled. Camera calibration is the process of estimating the camera model parameters that best describe what happens to a bundle of rays coming from the object as they pass through the lens and onto the image plane. Lens aberrations may include, but are not limited to, geometric distortion, lateral chromatic aberration, and vignetting.

Most, if not all, captured images include at least some geometric distortion introduced primarily by the camera lens components. Geometric lens distortion may be classified into two primary types—radially symmetric distortion and tangential distortion. Radially symmetric distortion, or simply radial distortion, may be present in captured images, for example as a result of the optical characteristics of lenses in conventional (film) and digital cameras. FIGS. 1a and 1b illustrate examples of radial distortion. Radial distortion may be classified into two types: barrel distortion, as illustrated in FIG. 1a, and pincushion distortion, as illustrated in FIG. 1b. Barrel distortion is typically associated with wide-angle lenses, while pincushion distortion is typically associated with long-range or telescopic lenses. Tangential distortion may, for example, be present in a captured image as a result of imperfect alignment of lens elements or other manufacturing defects in a compound lens. Tangential distortion is sometimes referred to as decentering distortion. FIG. 2 illustrates an example of tangential distortion. Many if not most captures images will include at least some general geometric lens distortion consisting of both radial distortion and tangential lens distortion components. FIG. 3 illustrates an example of geometric lens distortion with both barrel distortion and tangential distortion components.

Lateral chromatic aberration is an optical aberration that gives the appearance of color fringing, particularly along high-contrast areas of the image. This aberration is caused by different wavelengths that make up white light being magnified at different positions of the same focal plane. Vignette, or vignetting, refers to light falloff at the periphery of an image, giving the appearance of a darker border along the edges of the image.

Conventional camera calibration generally requires a special photography studio setup, where different calibration charts are required for capturing images for use in modeling different types of lens aberrations. For example, for geometric distortions, a checkerboard or grid chart (straight lines or points) is typically used. The camera is mounted on a work bench to make sure that its sensor plane is properly aligned (parallel) with the calibration chart. In the case of vignetting, a white board illuminated with a uniform light source is required. Other methods may be required for other lens aberrations including lateral chromatic aberration. A post-processing program would then analyze each captured set of data and estimate the camera model parameters separately, with a separate pass required for each aberration being modeled.

Conventional camera calibration methods thus typically require stringent studio setup and different setups for modeling different lens aberrations, making these methods difficult if not impossible for the typical photographer to attempt, and difficult and time-consuming even for professional photographers and photographic studios that have the facilities and skills necessary to attempt camera calibration. In addition, these conventional camera calibration methods are difficult if not impossible to apply to some types of lenses. For example calibrating many wide angle/fisheye lenses would require an inordinately large calibration chart.

SUMMARY

Various embodiments of methods and apparatus for camera calibration based on multiview image geometry are described. In embodiments, multiple images (multiviews) of a calibration chart may be captured using a camera/lens combination and input to a lens profiling module. The lens profiling module may analyze the multiple images and generate, in a single pass, two or more mathematical models for correcting two or more aberrations, including but not limited to lens aberrations, in images captured with the camera/lens combination. Aberrations that may be modeled include, but are not limited to, the lens aberrations of geometric distortion, lateral chromatic aberration, and vignetting. Some embodiments of the lens profiling module may estimate the geometric distortion, lateral chromatic aberration, and vignette model parameters for a camera/lens combination in a single pass based on the multiview image geometry by observing a constantly (but not necessarily uniformly) lighted checkerboard chart in the same setup. This significantly relaxes the camera calibration setup when compared to conventional methods, simplifies the workflow for producing lens profiles when compared to conventional methods, and reduces the work of users who want to produce a complete lens profile when compared to conventional methods.

Embodiments of the lens profiling module may model and predict the optical behavior of a photographic system (optics+image sensor+image processing). The estimated model for the photographic system may be used to apply appropriate corrections to lens distortions including geometric distortion, lateral chromatic aberration, and vignetting. The data for these customized corrections may be stored in a lens profile generated by the lens profiling module. Embodiments of the lens profiling module may generate a model for optical behavior by drawing on data points from a set of images of a calibration chart (e.g., a checkerboard chart) captured with the photographic system. In some embodiments, the lens profiling module may only draw information from the checkerboard part of the images.

Some embodiments of the lens profiling module may allow the user to specify the model complexity for the lens models. Some embodiments of the lens profiling module may support an automatic method for determining model complexity. In some embodiments, for a given model (e.g., the geometric distortion model), the lens profiling module may try all model complexities to generate estimated models, and compare each estimated model to determine an optimal estimated model (and thus an optimal model complexity).

While embodiments are generally described as modeling lens aberrations including geometric distortion, lateral chromatic aberration, and vignette, the methods may be generalized to model other forms of camera/lens aberrations such as lens optical blur, sensor noise (e.g., how the sensor changes with respect to ISO settings of the camera), color/spectral aberrations, and so on.

Figure 1A:
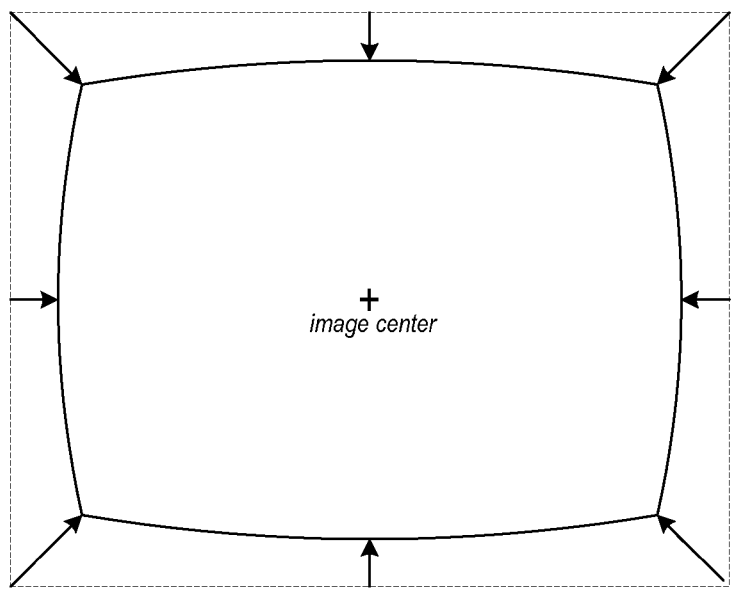
FIGS. 1A and 1B illustrate two types of radial distortion, barrel distortion and pincushion distortion, respectively.
Figure 1B:
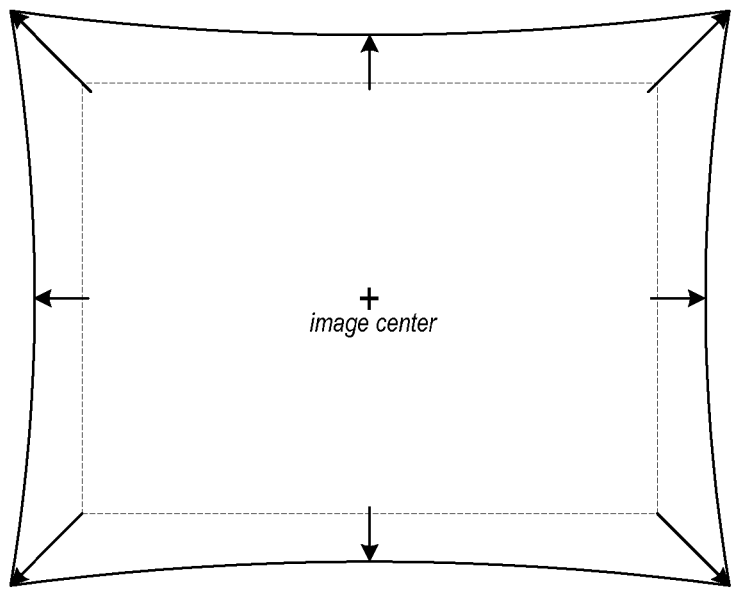
Figure 2:
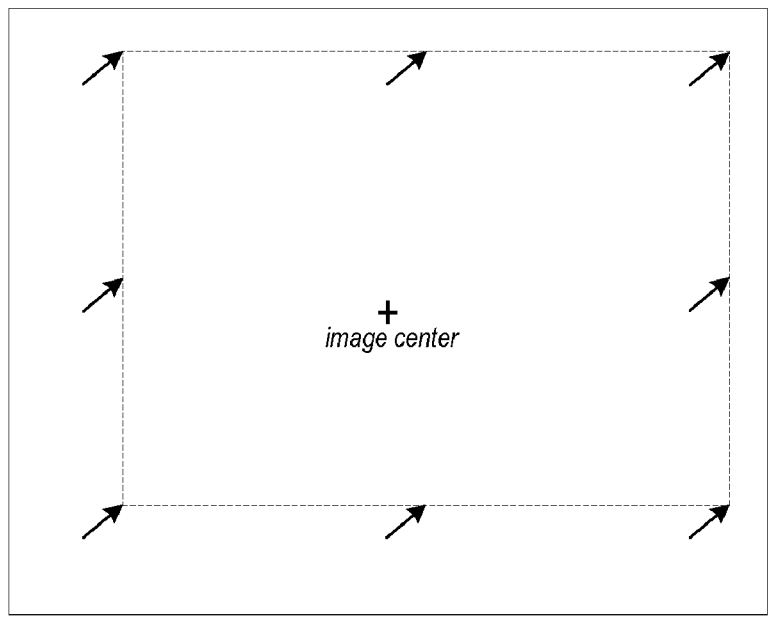
FIG. 2 illustrates tangential distortion.
Figure 3:
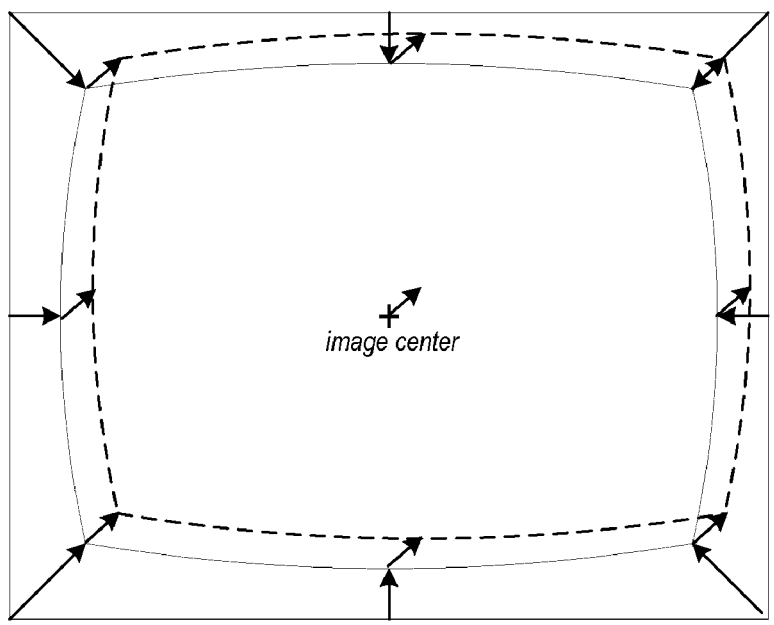
FIG. 3 illustrates an image with lens distortion including both radial and tangential distortion components.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the detailed description which follow are presented in terms of algorithms or symbolic representations of operations on binary digital signals stored within a memory of a specific apparatus or special purpose computing device or platform. In the context of this particular specification, the term specific apparatus or the like includes a general-purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Various embodiments of methods and apparatus for camera calibration based on multiview image geometry are described. In embodiments, multiple images (multiviews) of a calibration chart may be captured using a camera/lens combination and input to a lens profiling module. The lens profiling module may analyze the calibration chart information in the multiple images and generate, in a single pass, two or more mathematical models for correcting two or more aberrations, including but not limited to lens aberrations, in images captured with the camera/lens combination. Aberrations that may be modeled include, but are not limited to, the lens aberrations of geometric distortion, lateral chromatic aberration, and vignetting.

A lens profile may be defined as a file that contains a model description for a specific camera body and lens combination. A lens profile may be read by an image processing application to specify aberration corrections, including but not limited to lens aberration corrections, to input images captured with the respective camera/lens combination. An example format for a lens profile is provided later in this document. Embodiments of the lens profiling module may generate a lens profile including two or more models for correcting two or more types of aberration corrections, including but not limited to lens aberration corrections, in a single pass from a single set of captured calibration images, where a single calibration chart is captured in each calibration image from a different perspective.

Some embodiments of the lens profiling module may estimate the geometric distortion, lateral chromatic aberration, and vignette model parameters for a camera setup in a single pass based on the multiview image geometry by observing a constantly (but not necessarily uniformly) lighted checkerboard chart in the same setup. This significantly relaxes the camera calibration setup when compared to conventional methods, simplifies the workflow for producing lens profiles when compared to conventional methods, and reduces the work of users who want to produce a complete lens profile when compared to conventional methods.

Embodiments of the lens profiling module may model and predict the optical behavior of a photographic system (optics+image sensor+image processing). The estimated model for the photographic system may be used to apply appropriate corrections to lens distortions including geometric distortion, lateral chromatic aberration, and vignetting. The data for these customized corrections may be stored in a lens profile generated by the lens profiling module.

Embodiments of the lens profiling module may generate a model for optical behavior by drawing on data points from a set of images of a calibration chart (e.g., a checkerboard chart) captured with the photographic system. In some embodiments, the lens profiling module may only draw information from the checkerboard part of the images. Since the lens profiling module is attempting to characterize optical behavior by drawing on a set of finalized images, care must be taken to capture and provide a set of representative images for a given photographic system. Example methods for capturing sets of representative images of the calibration chart for use with the lens profiling module are described herein.

While embodiments are generally described as modeling lens aberrations including geometric distortion, lateral chromatic aberration, and vignette, the methods described herein may be generalized to model other forms of camera/lens aberrations such as lens optical blur, sensor noise (e.g., how the sensor changes with respect to ISO settings of the camera), color/spectral aberrations, and so on.

Camera Calibration Methods and Apparatus Based on Multiview Image Geometry

Figure 4:
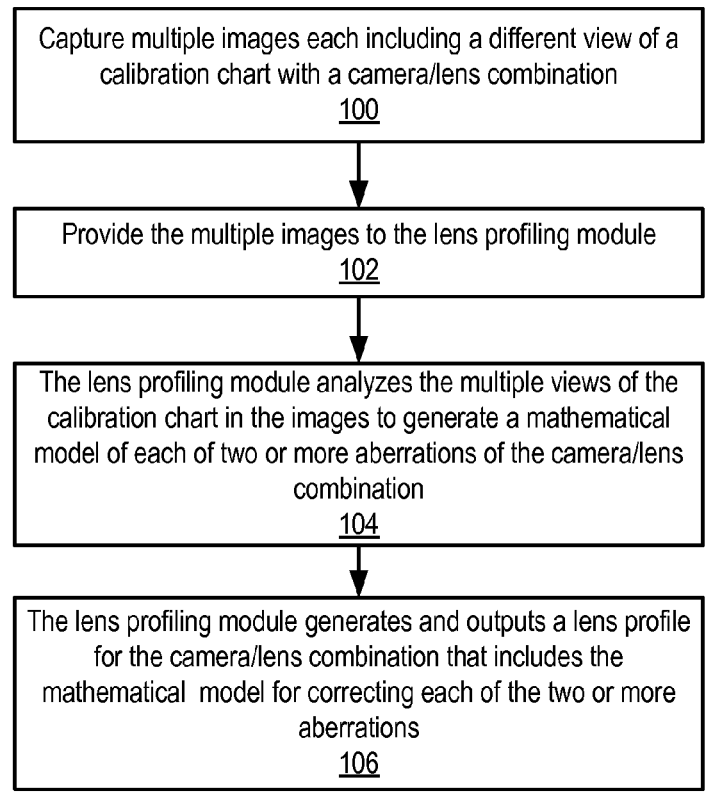
FIG. 4 is a high-level flowchart of a method for camera calibration based on multiview image geometry, according to some embodiments.
Figure 6A:
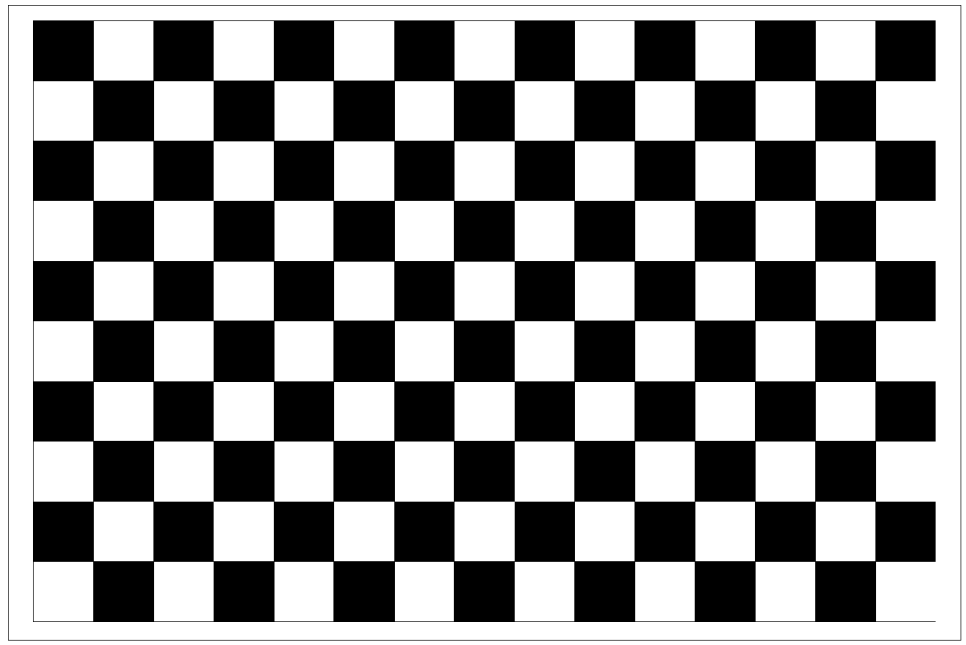
FIGS. 6a through 6d illustrate several different types of calibration charts, according to some embodiments.
Figure 6B:
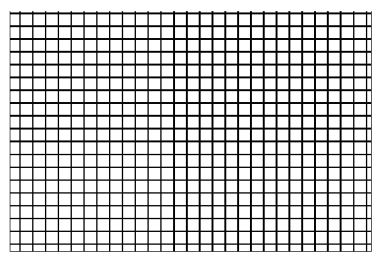
Figure 6C:
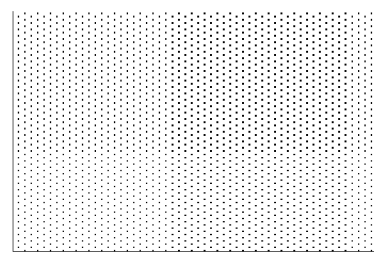
Figure 6D:
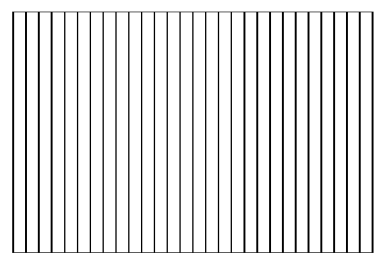

FIG. 4 is a high-level flowchart of a method for camera calibration based on multiview image geometry, according to some embodiments. As indicated at 100, multiple images each including a different view of a calibration chart are captured using a camera/lens combination. A method for capturing these multiple views of a calibration chart is described below. The calibration chart may, for example, be a checkerboard chart, an example of which is illustrated in FIG. 6a. Other types of calibration charts may be used in some embodiments, however, including but not limited to a chart containing vertical and horizontal lines, an example of which is shown in FIG. 6b; a chart containing dots or points, or circles, an example of which is shown in FIG. 6c; and a 2D "barcode" type chart, an example of which is shown in FIG. 6d. As indicated at 102, the multiple images (a set of calibration images) may be provided to the lens profiling module. As indicated at 104, the lens profiling module analyzes the multiple views of the calibration chart in the calibration images to generate a mathematical model of each of two or more aberrations, including but not limited to lens aberrations, of the camera/lens combination used to capture the calibration images. Example aberrations that may be modeled include, but are not limited to, the lens aberrations of geometric distortion, lateral chromatic aberration, and vignette. As indicated at 106, the lens profiling module generates and outputs a lens profile for the camera/lens combination that includes the mathematical model for correcting each of the two or more aberrations. Embodiments of a lens profiling module, and the operations thereof, will be described later in this document. The aberration models in the generated lens profile may, for example, be read by an image processing application to apply the models to correct respective aberrations in input images captured with the respective camera/lens combination.

While embodiments are generally described in reference to generating lens profiles for single lens reflex (SLR) cameras, some embodiments of the lens profiling module may be used to generate a lens profile for any type of camera, including but not limited to SLR cameras, point-and-shoot cameras and camera phones.

Methods for Capturing Multiple Views of a Calibration Chart

As indicated at 100 of FIG. 4, multiple images each including a different view of a calibration chart are captured. This section describes a method for capturing a set of calibration images with a camera and lens combination; the set of images may then be provided to the lens profiling module to create a lens profile for customized lens corrections including models for correcting two or more types of lens distortions of the particular camera/lens combination.

Figure 5:
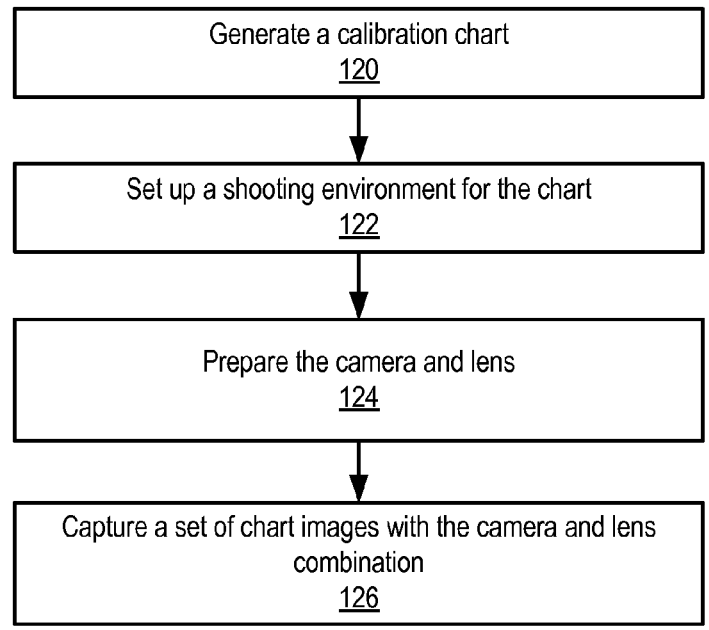
FIG. 5 is a high-level flowchart of a method for capturing a set of calibration images with a camera and lens combination, according to some embodiments.

FIG. 5 is a high-level flowchart of a method for capturing a set of calibration images with a camera and lens combination, according to some embodiments. Following this method, a set of calibration images may be captured that are both compatible for use with the lens profiling module and optimal for representing the optical characteristics of the user's camera and lens combination. However, note that this method may be modified in various ways while still producing at least acceptable calibration images.

Generating a Calibration Chart

As indicated at 120 of FIG. 5, a calibration chart may be generated. For example, the user may print a calibration chart provided by the lens profiling module on a laser printer, inkjet printer, or other type of printer, or may otherwise generate the calibration chart or obtain a printed chart from elsewhere (for example, a printed chart may be bundled with the lens profiling module software or may be provided as a page in a manual). The chart may be generated on letter-sized paper, A4 paper, or paper of other sizes. The chart may be printed in different sizes, for example 9"×12", 18"×24", 24"×36", or 36"×48", depending on the particular camera/lens combination and desired shooting setup. The chart may be generated on various types and weights of paper, including conventional laser printing paper or photographic-quality paper. A flat or matte printed chart may be preferable to a glossy printed chart, as glossy prints tend to cause undesirable reflections or other light effects. It is generally only necessary to generate one copy of the calibration chart. The calibration chart, once printed, may be mounted, if desired, for example on a foam board, for additional stability. As an alternative to a printed calibration chart, a calibration chart may be directly displayed on a display screen, for example on a high-resolution LCD screen.

In some embodiments, the lens profiling module may provide a selection of calibration charts from which the user may select an appropriate chart. In some embodiments, the calibration chart(s) may be checkerboard charts, for example as illustrated in FIG. 6a. However, other types of calibration charts may be used in some embodiments, for example any one of the example charts illustrated in FIGS. 6b-6d. Selecting a proper calibration chart may depend on many factors. A rule of thumb is to select the largest chart that can be readily printed, and to select a chart with the smallest squares that the lens profiling module can reliably detect for the planned shooting distances.

Calibration charts may vary based on the size of the square and the number of squares in the chart. A chart with more squares will provide more data points for the lens profiling module, while a chart with larger squares may be easier for the lens profiling module to detect. Generally, when shooting the printed chart with a camera, the chart should take up about ½ to ¼ of the image frame of the camera. When selecting a chart, the user should consider how close or far away the camera may be in relation to the chart. There should be enough room for moving the camera away from the chart, if necessary.

The dimensions of the individual checkers (when using a checkerboard calibration chart) or other calibration chart content may be considered when selecting a chart. In some embodiments, for the final image set produced by shooting the chart with a camera, the screen pixel dimension (height or width) for the smallest checker (or other image object) may be approximately 20 pixels. However, the checkers may become distorted by the camera angle in regards to the chart when an image is captured, or by distortion from the lens itself (as in fisheye lens distortion). Therefore, the smallest checker may have a height dimension that is different from its width dimension. In some embodiments, the larger of these dimensions should be at least 20 pixels.

The user may select multiple charts for printing, and may print a different-sized chart, for example 9"×12", 18"×24", 24"×36", or 36"×48", as appropriate for different cameras, lenses, and focal lengths.

A single chart may generally be used for a given shooting iteration. In other words, for a given camera body, lens, and focal length combination, only one chart should be photographed for the set of images. If the body and lens stay the same but another set is captured under a different focal length, as with a zoom lens, a different chart may be used to accommodate the focal length.

If no calibration chart is made available to the user or if the user cannot locate a provided chart that suits the user's particular needs, the user may create a custom calibration chart, for example by modifying an existing calibration chart.

The user may check a printed calibration chart for quality, for example to check that the print is completely in register (e.g., make sure no color fringing appears around the checker squares) and that no ink bleeding has occurred.

A calibration chart may, for example, be a checkerboard chart, an example of which is illustrated in FIG. 6a. Other types of calibration charts may be used in some embodiments, however, including but not limited to a chart containing vertical and horizontal lines, an example of which is shown in FIG. 6b; a chart containing dots or points, or circles, an example of which is shown in FIG. 6c; and a 2D "barcode" type chart, an example of which is shown in FIG. 6d.

Encoding Information in Calibration Charts

In some embodiments, information may be encoded in a calibration chart. For example, barcode charts may be used (see, e.g., FIG. 6d), and the barcode may encode chart information such as the type of chart, the position, size and color of the calibration patterns, and so on. The user may select the appropriate barcode calibration chart from a set of calibration charts, and print the chart. After the calibration images are captured and provided to the lens profiling module, the module may read the barcode from the image to decode the barcode's encoded information, and use this information in estimating the camera model.

Color Calibration Charts

Generally, black and white calibration charts are described in relation to embodiments. However, in some embodiments, color calibration charts may be used. Color calibration charts may, for example, allow the lens profiling module to characterize sensor spectral responses or other color-related effects.

Setting Up the Shooting Environment

As indicated at 122 of FIG. 5, the user may then set up the shooting environment for the calibration chart. The following describes an example of how the shooting environment may be set up, and is not intended to be limiting. Following this method exactly may not be necessary; however, the method, if followed, may provide better overall results.

Figure 7:
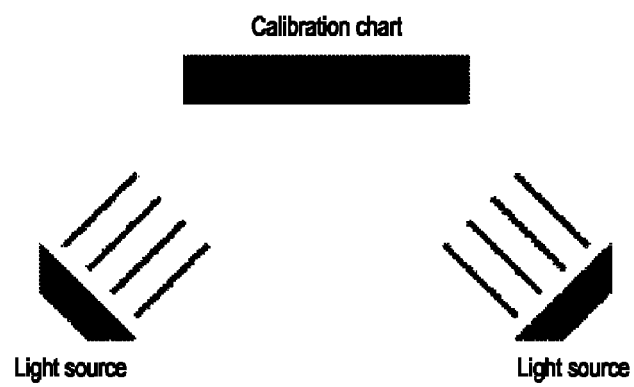
FIG. 7 illustrates an overhead view of an example calibration chart and lighting setup.

The calibration chart is placed on a steady surface, such as a wall or easel. Two lights, preferably of the same model, illuminant type (tungsten, fluorescent, etc.), color temperature, lighting strength, and age are selected. The lights may set to face towards the chart at opposing 45-degree angles (see FIG. 7). The lights should measure an equal distance from the center of the chart to each light source. While a two-light setup may be used to obtain good results, additional lights may be used. Alternatively, ambient lighting or natural daylight may be used. The goal is to achieve a constant and approximate lighting uniformity across the calibration chart. The more uniform the lighting on the chart, the less variation there is in the vignette model parameter estimation. The calibration chart should be clean. A uniform background that is darker than the white portions of the chart may help the lens profiling module detect the calibration chart in the captured images.

Preparing the Camera and Lens

As indicated at 124 of FIG. 5, the user may prepare the camera and lens. The following describes an example method for preparing the camera/lens combination, and is not intended to be limiting. Following this method exactly may not be necessary; however, the method, if followed, may provide better overall results. The user may also prepare a tripod to mount the camera/lens combination. Note that the use of a tripod is optional, but may provide better results for at least some camera/lens combinations.

Preparing the Camera

If the camera has updatable firmware, the user should configure the camera with the firmware version the user plans to use when shooting images with the camera. In-camera processing settings (e.g., sharpening, color, contrast, etc.) should be zeroed or set to neutral. The image file-type should be set to match the shooting workflow. Uncompressed RAW should be used for photographers who typically work with RAW-files. Highest-quality JPEG should be used for non-RAW workflow users. The shooting mode of the camera should be set to "manual" for keeping the exposure constant throughout the shooting iteration. The camera should be set to a constant ISO (too much noise could have an effect on the results of the calibration; an ISO around 400 or less may be best, based on exposure needs). The white-balance should be set to Auto, or the desired preset appropriate for the shooting environment. White balance, unless extremely inaccurate, should have a minimum effect on the lens profile quality. White balance may be customized if necessary. The color profile should be set to the profile that the user prefers to shoot with, and should be kept constant throughout the shooting session. The camera's orientation (i.e. "landscape" vs. "portrait") should be kept constant for a single shooting iteration. Any date/time imprint features should be turned off. Any in-camera processing that can be switched off (e.g., "creative effects", image correction, vignette/exposure compensation, noise reduction, etc.) should be switch off. Histogram and highlight-clipping indication features, if available, should be enabled in the image preview mode of the camera. This may be used as an aid to determine if the white of the chart is being clipped due to the exposure level. The camera should be set to single-shot image capture. The camera should be set to the desired focus mode. A single-point focus may be easiest for keeping the chart in focus from shot to shot. A compatible memory card should be inserted into the camera, if necessary.

Preparing the Lens

The lens should be properly attached to the camera body. The lens should be set to the preferred focus mode (e.g., auto vs. manual focus). If using auto-focus, the camera should be set to single-shot focus as opposed to a continuous focus mode offered on some cameras for focusing moving subjects. The lens should be adjusted to the desired focal length. Care should be taken not to accidentally adjust focal length by bumping or moving the focal length ring during shooting. This can alter the focal length metadata produced by the camera. If shooting a zoom lens, the lens should be adjusted to a single focal length for the shooting iteration. If using a lens with an aperture ring on a camera body that makes aperture adjustments through the camera body, the aperture ring should be adjusted to the proper default position to enable in-camera aperture adjustment. For camera body-controlled aperture adjustments, the aperture ring of the lens may be set to the maximum aperture.

When using the lens profiling module, the user may run the lens profiling module for multiple shooting iterations for a single camera/lens combination, and append the data from additional shooting iterations to the same lens profile. Shooting a separate iteration for the minimum, maximum, and middle focal lengths of a zoom lens may be good practice.

Preparing the Tripod

A tripod may optionally be used to mount the camera/lens combination. For shooting environments that require slower shutter speeds, the use of a tripod may be best. Combined with live-view, a tripod-mounted camera is also much easier to adjust for making tightly-frame chart shots. When using a tripod, adjust the tripod to the appropriate height, and properly mount the camera to the tripod.

Capturing the Calibration Images

As indicated at 126 of FIG. 5, a set of calibration images for the camera/lens combination may be captured. Note that multiple sets may be captured for a given camera/lens combination, for example at different focal lengths of a zoom lens. The following describes an example method for capturing a set of chart images for the camera/lens combination, and is not intended to be limiting. Following this method exactly may not be necessary; however, the method, if followed, may provide better overall results.

The camera/lens combination (optionally on a tripod) should be set at a distance such that the calibration chart fits within the image frame. Generally the entire checkerboard pattern should fit within the image frame and should be approximately ¼ of the area of the entire image frame of the camera when shooting. However, this may be varied. The goal is to capture a set of images where the checkerboard coverage fills the entire image frame when adding up different areas of coverage from shot to shot. Do not place the camera so close to the chart that it blocks part of the light falling on the chart. The focus distance should be kept consistent for a given shooting iteration. The aperture and shutter speed should be adjusted to achieve optimal exposure. A test shot may be taken and the histogram of the image (if available) previewed to verify that an optimum exposure is achieved while not clipping (over-exposing) the highlights of any of the white squares of the chart. When choosing an aperture, an aperture of f/8 or f/11 may be used for most SLR camera/lens combinations. A lower f-number may be used if the user typically shoots at a wider aperture and would like to have stronger vignette correction. Once the proper exposure is found, the manual exposure settings (aperture and shutter speed) should be kept constant throughout the shooting iteration.

Figure 8:
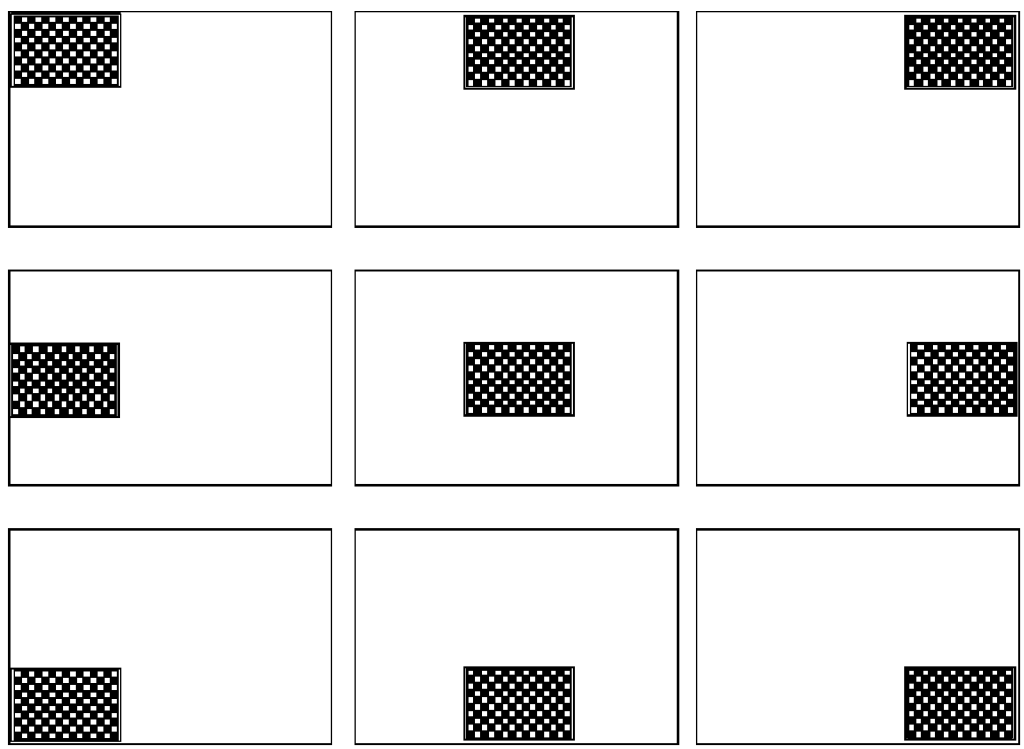
FIG. 8 illustrates the framing of an example calibration chart in nine images, according to some embodiments.

The number of images to capture for a shooting iteration should be determined. The number of images should be chosen so that, given the area of the chart in regards to the image frame, the chart will cover as many different areas of the image frame as possible. For example, nine images may be used for a single iteration, with the chart framed in the center, top, bottom, two sides, and four corners of the image frame for each respective shot, for a total of nine images. See FIG. 8, which illustrates the framing of the calibration chart in nine images. Also see FIG. 9, which shows an example set of calibration images for the 70 mm focal length of an 18-200 mm zoom lens, and FIG. 10, which shows an example of a set of calibration images captured with a 15 mm fisheye lens. Note that fewer or more than nine images may be captured in a single shooting iteration, if necessary or desired. However, in some embodiments, a minimum of three calibration images may be required by the lens profile module for creating a lens profile.

The user may then frame, focus, and capture the calibration image. With the exception of the center-framed chart shot, each shot should be framed so that the given boundary of the chart runs as close to the edge of the image frame as possible, while making sure that none of the checkers become clipped outside of the frame. When framing the chart at the edges of the image frame, a small amount of visible white should be left between the checkers and the edge of the frame. Live-view and a tripod may be used to achieve tighter framing. When framing the chart in different areas of the image frame, a combination of physically moving and tilting the camera to achieve an optimal balance may be used. Re-focusing may be performed for every new image, if necessary. The image preview and preview-zoom options on the camera may be used to check on the framing of the chart and to confirm that no checker squares are clipped.

Figure 9:
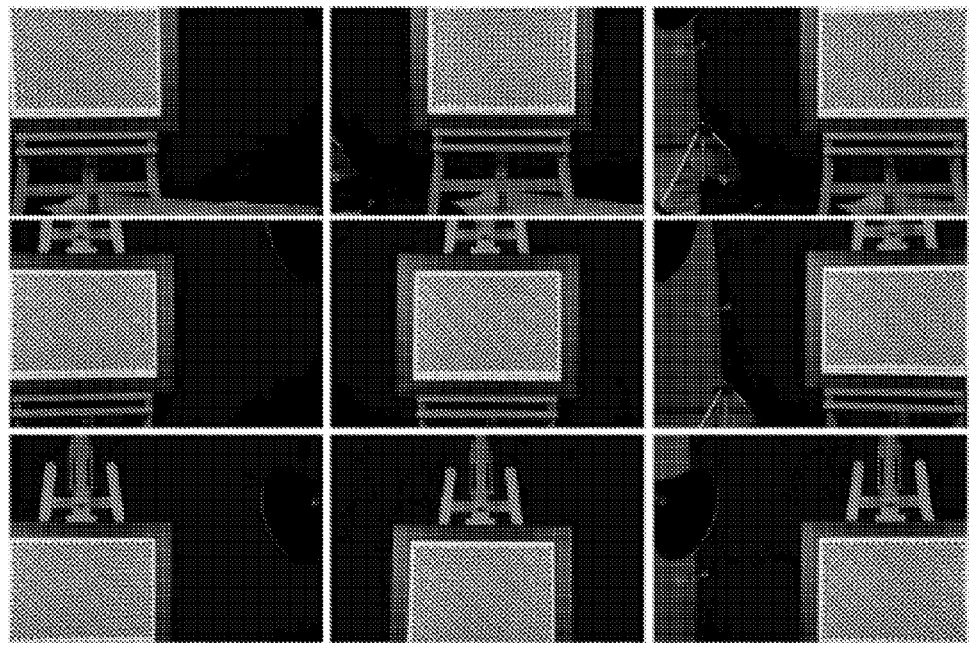
FIG. 9 shows an example set of calibration images for the 70 mm focal length of an 18-200 mm zoom lens, according to some embodiments.

After all the images have been captured, the user has a set of calibration images ready to be provided to the lens profiling module for generating a lens profile for the camera/body setup. FIG. 9 shows an example set of calibration images for the 70 mm Focal Length of an 18-200 mm zoom lens. A separate iteration may be performed for the minimum, maximum, and middle focal lengths of a zoom lens (or for multiple but fewer or more focal lengths of a lens, if desired). Thus, multiple sets of calibration images may be generated for a camera/lens combination. Each of these sets can be provided to the lens profiling module; the data from the multiple shooting iterations may be included in the same lens profile.

Optics and Other Considerations

The optical characteristics of the photographic system (e.g., camera/lens combination) may have the largest effect on the quality of the generated lens profile. Optical characteristics that may be controlled by the user generally include:

Aperture
Focal Length
Focus Distance

Each of these factors, if changed, will physically change the way light is passing into and through the photographic system.

Aperture

Aperture primarily affects the results of vignette correction. If a lens profile is generated with a set of images shot at the maximum aperture (the lowest f-number, a.k.a. wide-open), more light falloff will be introduced into the system, and therefore images will generally have a stronger vignette than if the aperture were adjusted to a higher f-number. For a given camera/lens combination, a lens profile generated with one aperture may over or under-correct the vignette of images shot with the same camera/lens at a different aperture. When considering the aperture to use with a shooting iteration, the user's own workflow should be considered. For example, a different lens profile iteration may be performed for each aperture that the user wants to correct for.

Focal Length

Focal length has a significant effect on geometric distortion, chromatic aberration, and vignette. Changing the focal length fundamentally changes the way light passes into the photographic system by changing the distance relationship of the elements within the lens. Profiling for each focal length that the user plans to shoot with may provide optimum profile iterations for the minimum, maximum, and middle focal lengths.

Focus Distance

Focus distance also changes the distance relationship of elements inside the lens, since changing the focus (e.g., to accommodate different subject distances) will move the lens elements. This change has a smaller effect on geometric distortion and chromatic aberration when compared to changing the focal length. Changing focus may still have a large effect on vignette, however. Focus-related distortions tend to be greater at closer focus distances. For deciding the focus distance to use, it may be better to shoot separate iterations for infinity and closer focus distances respectively.

When framing for different focus distances, the size of the chart may need to be considered. It may be necessary or desirable to shoot more than nine images to cover the entire image frame area when shooting at further distances. A chart with larger chart squares may improve the chances of proper grid (e.g., corner) detection within the lens profiling module when using images shot from longer distances. In some embodiments, a minimum recommended dimension of a chart square (height or length) inside of an image is 20 pixels.

Image Sensor

The photographer may have less to consider in regards to the image sensor when controlling the photographic system. The ISO is the only control to consider, since it controls the gain being applied to the original image signal, giving the perceived quality of changing the sensitivity of the sensor. ISO should not have a strong effect on the quality of the lens profile, but shooting at extremely high ISO levels may introduce enough noise to confuse grid detection in the lens profiling module, or may confuse the modeling of the optical behavior itself. If the user typically shoots at ISOs higher than 400 (for digital SLR cameras), profiling at the ISO that the user typically used may produce better results. If the user shoots at ISOs around 400 or less, using any ISO in this range to meet the exposure needs should produce good results.

Image Processing

Image processing is the last step in producing a final image, and has the greatest potential to distort the original optical information that the lens profiling module seeks to characterize. File format, noise reduction, and in-camera lens corrections should be considered when deciding what settings to use for shooting a calibration chart.

File Format

Photographers that shoot with a RAW file format often have little or nothing to consider in regards to image processing. The goal of the RAW workflow is to give the photographer as much control as possible over original captured image data. Non-RAW file formats, such as JPEG, may still be used to generate lens profile files, but since more in-camera image processing is introduced into this workflow, there is more to consider in regards to camera settings. Image processing changes the original image data that passes through the lens and is captured by the sensor. Since the lens profiling module functions by characterizing the behavior of this original data, better results may be produced by leaving the original data as untouched as possible when shooting chart images for lens profile generation. Due to certain forms of image processing differences between RAW and non-RAW workflows which cannot be controlled by the user, the calibration images should be captured in the file format that follows the user's shooting workflow.

Noise Reduction

Most forms of in-camera noise reduction seek to preserve original image information as much as possible, while only removing image information that is not a part of the original subject being captured (i.e. noise from high ISO's, hot pixels, etc.). In-camera noise reduction should have little effect on the quality of the lens profile. However, since any processing may have some small effect on the original image data (and possibly introduce randomness between shots when implemented) noise reduction settings for the camera body should generally be turned off.

In-Camera Lens Correction

Some cameras, when shooting in a non-RAW file format, will automatically make certain lens corrections to the image, namely chromatic aberration corrections and vignette correction. Chromatic aberration corrections are often applied without any option for the user to turn off the correction. Depending on the camera used, some of these corrections may be applied on a shot-to-shot basis, where some images will be corrected for chromatic aberration while others will not be corrected. Vignette correction is more often available to switch on or off. These corrections may be avoided by shooting with a RAW file format. If using a non-RAW file format, the results of a RAW versus non-RAW scene may be compared by shooting in a RAW+JPEG format mode. The same scene shot with two different formats may be compared to see if corrections appear in the non-RAW file.

If using non-RAW images for calibration, the lens profiling module may produce better results from images that have not already been corrected with in-camera lens corrections. Techniques to avoid these corrections before running non-RAW images through the lens profiling module, such as converting RAW images to a desired non-RAW format, may be applied.

The lens profiling module may model (characterize) the optical behavior of a photographic system (a lens/camera combination). Since the lens profiling module draws this model from a set of final output images, the model will ultimately represent the optical data as modified by the full photographic system. Reducing as much randomness as possible between the optical input and the processed image output may result in better lens profiles as output of the lens profiling module. However, it may be impossible to eliminate all randomness in any photographic system.

Special Camera/Lens Scenarios

Some types of cameras and lenses may require calibration chart shooting procedures that differ from the general procedure outlined above. Some examples are given below.

Fisheye lens

Figure 10:
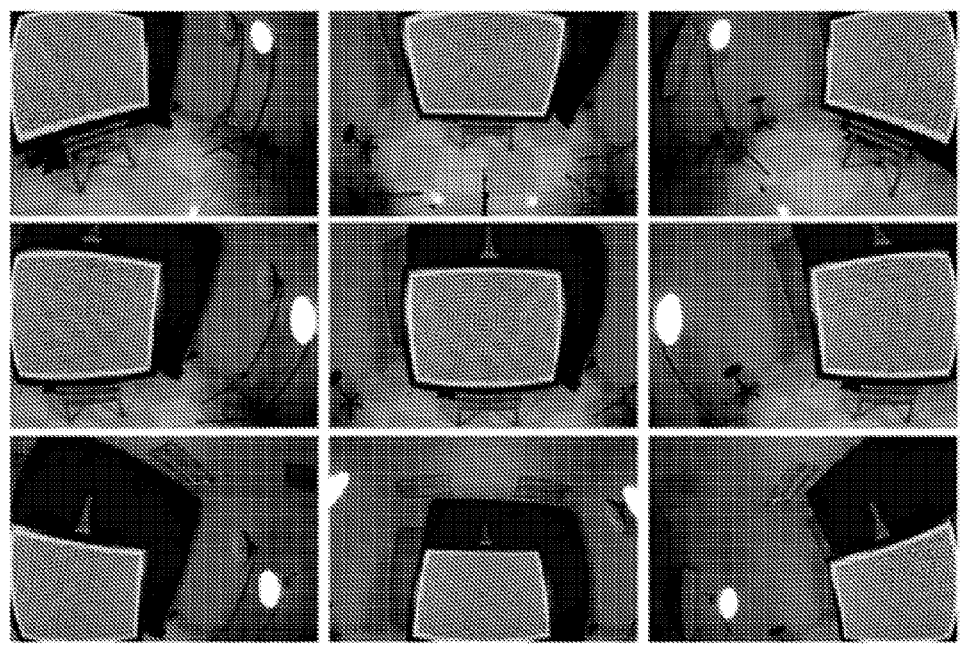
FIG. 10 shows an example of a set of calibration images captured with a 15 mm fisheye lens, according to some embodiments.

FIG. 10 shows an example of a set of calibration images captured with a 15 mm fisheye lens. A fisheye lens is a lens that bends light differently from a rectilinear lens to give it a wider field of view. The distorted appearance of a fisheye lens is the result of barrel distortion (see FIG. 1a). A calibration image captured with a fisheye lens is captured in the same manner as with a rectilinear lens. However, when framing the chart in the corners of the image frame, the distortion of the fisheye may make it difficult or impossible to push the checker pattern into the farthest edge of the corner while keeping the entire chart inside of the image frame (see FIG. 10). In some embodiments, the 20-pixel minimum pixel dimension for the smallest-sized checker square within a captured chart image should be considered for fisheye lenses. It may be necessary or desired to select a chart with larger physical checkers when shooting with a fisheye lens, since the high level of distortion, particularly at the periphery, will shrink and squeeze the dimensions of the checkers near the edge of the image frame.

A circular fisheye lens is a lens that distorts the image (bends incoming light) into a nearly perfect circle. The circular image only covers the center part of a camera's image frame. Calibration images for a circular fisheye lens may be shot in the same manner as the main shooting procedure, with the exception of framing the chart inside of the image.

It is normally optimal to frame the shot with a combination of moving the camera (up-down, sideways) combined with tilting the camera (angling the camera in regards to the chart plane). For a circular fisheye lens, however, the best framing may be achieved by simply positioning the camera to face the center of the chart, as in a center-framed shot, and then angling/tilting the camera up, down, and side-to-side to frame the remaining shots (with no need to physically move the camera from its center position).

The edge checkers should not hug the circular frame too tightly. The extreme distortion of the lens squeezes the edge checkers of the chart so much that they may become too small for the lens profiling module to detect if they are too close to the edge of the circular frame. In regards to detecting the chart in the lens profiling module, the physical size of the checkers in the chart, and the camera's distance to the chart, should be considered when framing for the circular fisheye.

Since there is no way to frame the chart in the "corners" of the circular image, it may be desirable to rotate the camera slightly to shoot the chart in a diagonal-style position. The diagonal of the chart in the image frame, however, should be less than 45° from the chosen orientation (landscape or portrait).

Point-and-Shoot Cameras

A point-and-shoot camera is a compact camera with a built-in lens. As the name implies, it is designed to be a fully automatic shooting experience for the user. The following guidelines may be followed if the settings mentioned are available for the user to control on the camera. The calibration images for a point-and-shoot camera may be shot in the same manner as the general shooting procedure described above, with the exception of image processing and exposure control.

If RAW file format is available, selecting the RAW file format may automatically turn off any available, user-controlled image processing settings that could affect the quality of the lens profile. Whether shooting in a non-RAW or RAW file format, however, the available user-controlled image processing settings may be considered before shooting calibration images with the camera.

If available, the camera's exposure should be set to manual shooting mode. If manual is not available, but aperture-priority is, the camera should be set to aperture priority to achieve a constant aperture throughout a shooting iteration. Point-and-shoot camera ISO's, and how they affect the level of noise reduction, can vary greatly in behavior when compared to similar digital SLR ISO's. The calibration images should be shot with a constant ISO, if available, with the ISO set to whatever the user typically shoots with.

Camera Phones

The term "camera phone" refers to a camera that is built into (and controlled through) a cell phone. Most camera phones are fully automatic, with even less control than most point-and-shoot cameras. Camera phones generally contain higher levels of in-camera image processing when compared to point-and-shoot cameras or digital SLR cameras, meaning that the optical data may be heavily modified before it reaches the lens profiling module. Camera phones are also more likely to contain lens correction adjustments already inside of their image processing pipelines. The same guidelines described above for point-and-shoot cameras may be followed if any of these controls happen to be available through the menu of the camera phone.

Lens Profiling Module

Embodiments of a lens profiling module may be used to analyze data from sets of calibration images to generate customized lens profiles for correcting each of two or more aberrations, for example geometric distortion, chromatic aberration, and vignette, for camera/lens combinations. Some embodiments of the lens profiling module may be implemented, for example, as a plug-in for or module in an image processing application, such as Adobe® Photoshop®. Other embodiments may be otherwise implemented, for example as a stand-alone program or utility, or as a library function. The lens profiling module may provide a user interface via which the user may, for example, provide sets of calibration images to the lens profiling module and perform other operations that require user input (e.g., setting parameters, specifying output files, etc.).

Figure 11:
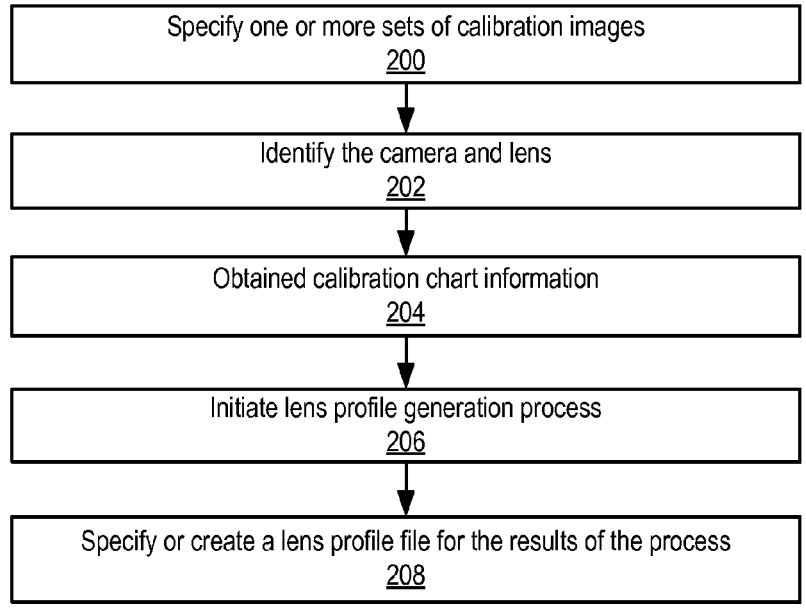
FIG. 11 is a high-level flowchart of a method of operation of a lens profiling module, according to some embodiments.

FIG. 11 is a high-level flowchart of a method of operation of a lens profiling module, according to some embodiments. As indicated at 200, one or more sets of calibration images for a particular camera/lens combination may be specified. For example, the user interface may provide menus or other user interface elements whereby a user may locate and select a folder or directory containing the images, or whereby a user may select the N images or M sets of images to be processed. (Note that there may be multiple sets for a single camera/lens combination, e.g. if the user captured a separate set of calibration images at each of multiple focal lengths of a lens). As indicated at 202, the camera and lens may be identified, for example by the user entering or selecting the names of the camera and lens via the user interface to the lens profiling module. Alternatively, camera/lens information may be read from metadata appended to the images. As indicated at 204, calibration chart information describing the particular calibration chart used may be obtained. For example, the user may be asked to provide the dimensions of the overall chart and the dimensions of the checkers or squares on the chart. As indicated at 206, the lens profile generation process may be initiated. For example, the user interface may provide a "generate profile" user interface element that, when selected, starts the process. As indicated at 208, the lens profile file to which the results of the process are to be written may be specified (if one already exists to which this new profile information is to be appended) or created (if this is a new profile).

Figure 12:
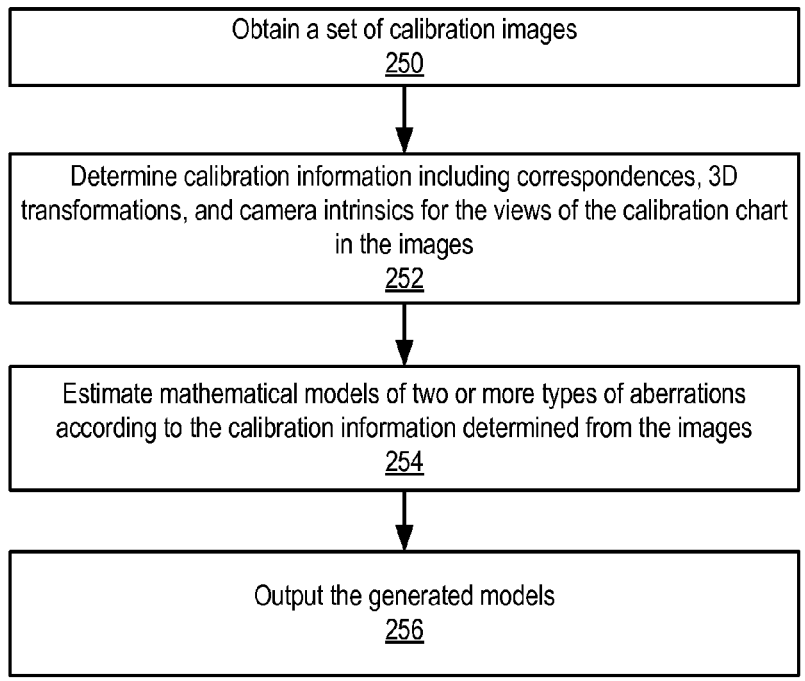
FIG. 12 is a high-level flowchart of a method for generating, in a single pass and from a single set of calibration images, two or more models for each of two or more aberrations, according to some embodiments.

As indicated at 104 of FIG. 4, the lens profiling module analyzes the multiple views of the calibration chart in the calibration images to estimate a mathematical model of each of two or more aberrations for the camera/lens combination used to captured the calibration images. FIG. 12 is a high-level flowchart of a method for generating, in a single pass and from a single set of calibration images, two or more models for each of two or more aberrations, according to some embodiments. Embodiments of the method may be implemented in or as a lens profiling module. As indicated at 250, a set of calibration images for a camera/lens combination may be obtained. As indicated at 252, calibration information including, but not limited to, point correspondences, 3D transformations, and camera intrinsics (e.g., image center, focal length, distortion parameters, etc.) for the views of the calibration chart in the images may be determined. To perform element 252, in some embodiments, the lens profiling module may detect reference points, for example the corners of a checkerboard pattern, of the view of the calibration chart in each image, and use these reference points in determining the point correspondences, 3D transformations, and camera intrinsics. In some embodiments, other reference points than corners may be used. As indicated at 254, mathematical models for two or more types of aberrations (e.g., geometric distortion, lateral chromatic aberration, and vignetting) may be estimated according to the calibration information determined from the images. The section titled Example camera model provided below describes example geometric distortion models for rectilinear lenses and fisheye lenses, an example lateral chromatic aberration model, and an example vignette model that may be used in some embodiments. As indicated at 256, the estimated models may be output. For example, in some embodiments, the estimated models may be written to a lens profile format to a new lens profile file, or appended to an existing lens profile file for the camera/lens combination. The section titled Example lens profile file format provided below describes an example lens profile file format that may be used in some embodiments.

Elements 250 through 256 may be repeated for one or more other sets of calibration images for the camera/lens combination, and the models estimated at 254 may be appended to a lens profile.

Tagging the Lens Profiles

Some embodiments may automatically tag the generated lens profiles with camera/lens metadata (e.g., EXIF metadata) obtained from at least one of the calibration images. This may, for example, allow applications that use the lens profiles to easily and automatically locate a correct lens profile for an image to be processed by comparing the metadata from the image to the metadata tagged into the lens profile.

Vignette Model Estimation

In order to estimate the vignette model, point correspondences need to be established between the different images of the same calibration chart. It is assumed that, at the same point on the chart, the lighting is constant from one image view to another. However, since the location of the calibration chart in each image is different, the same point shows up at different points in the various images, and thus at different points on the sensor. Once the point correspondences are established, the color values of each point are known, and the lens profiling module may recover the vignette falloff function.

Figure 13:
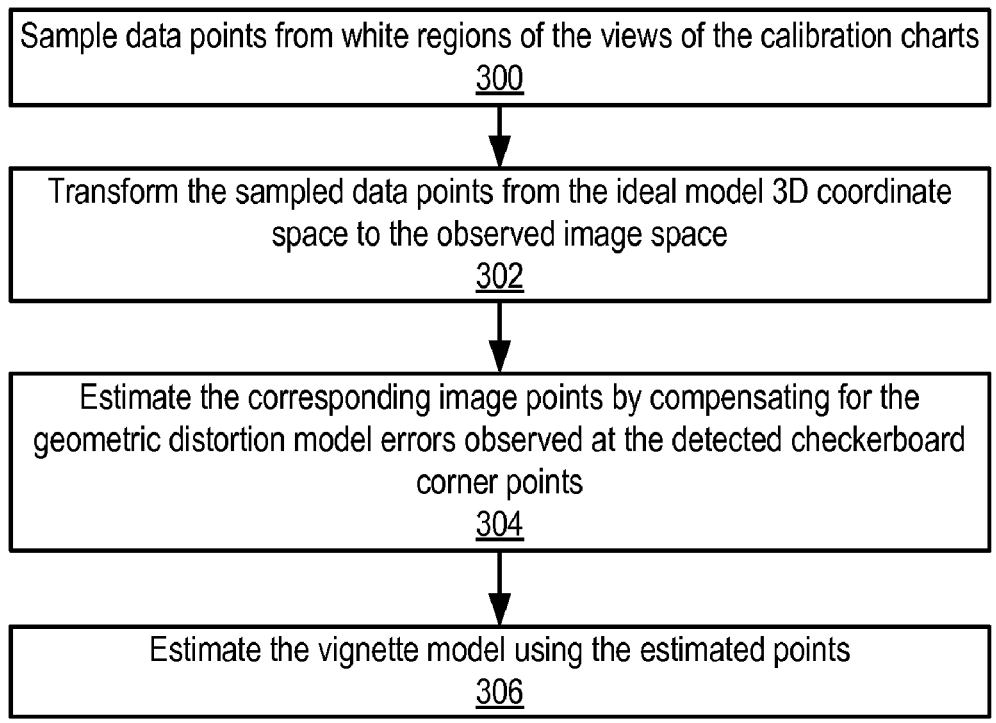
FIG. 13 illustrates a method for estimating the vignette model, according to some embodiments.

FIG. 13 illustrates a method for estimating the vignette model, according to some embodiments. As indicated at 300, for vignette model estimation, some embodiments of the lens profiling module may sample data points from only the white patches or regions of the views of the calibration chart (e.g., white squares of a checkerboard chart). As indicated at 302, the lens profiling module may transform the sampled data points from the ideal model 3D coordinate space to the observed image space. In some embodiments, the geometric distortion model is previously estimated, and thus the geometric distortion model may be used to transform the ideal checkerboard points onto each of the images. However, the geometric distortion model is an estimation, so there may be errors in the transformation. As indicated at 304, the lens profiling module may therefore estimate the corresponding image points by also compensating for the geometric distortion model errors observed at the detected checkerboard corner points. In some embodiments, for example, the lens profiling module may use the observed errors at the four corners of a white patch to interpolate (e.g., using a bilinear interpolation technique) to yield a corrected estimation of the internal points in the respective white patch. As indicated at 306, the estimated points may then be used to estimate the vignette model.

Automatic Model Complexity Selection

Some embodiments of the lens profiling module may provide automatic lens model selection via minimizing cross-validation errors. In camera calibration, an optimal lens model that optimally describes the characteristics of a camera/lens combination generally needs to be selected. The selection may serve as a tradeoff between minimizing the fitting error of the given observed data and its generality to other camera/lens combinations of the same model. Embodiments may implement an automatic model selection method for choosing the optimal rectilinear/fisheye geometric distortion models, the geometric distortion model complexities, the lateral chromatic aberration model complexities, the vignetting model complexities and the square or non-square pixel aspect-ratios.

Referring to the section Example camera model provided below, each of the models include polynomial information. For any given camera/lens combination, for the geometric distortion model, for example, a one term polynomial formulation may be sufficient, or a two term formulation may be sufficient, or more terms may be needed. For example, both radial and tangential distortion terms may be needed. When the model is estimated, the particular and optimal formulation to be used to estimate the model needs to be known. How many terms needs to be known, and whether both radial and tangential distortion terms are to be used needs to be known. Embodiments may allow the user to specify the model complexity, but may also provide an automatic method for determining which formulation is to be used.

Some embodiments of the lens profiling module may allow the user to specify the model complexity for the geometric distortion model, e.g. one term, two term, three term, five term, etc. (five term supports both radial and tangential terms). Some embodiments of the lens profiling module may allow the user to specify the model complexity for vignette model complexity and chromatic aberration model complexity.

Some embodiments of the lens profiling module may support an automatic method for determining model complexity. In some embodiments, for a given model (e.g., the geometric distortion model), the lens profiling module may try all model complexities to generate estimated models, and compare each estimated model to determine the optimal estimated model (and thus the optimal model complexity). In some embodiments, when trying each model complexity, the lens profiling module may set aside some data points (e.g., grid corner points) for evaluation. For example, approximately ⅓ of the data points may be set aside for evaluation. The rest of the data points may be used for model estimation. The estimated model may then be applied to the points set aside for evaluation to determine how good the estimated model is. Alternatively, to evaluate the estimated model, the 3D image checkerboard corners may be projected onto the image using the estimated model, and the deviation of the projected corners from the measured corners may be determined. This kind of error, deviation from the truth, provides information related to how good the estimated model is in terms of predicting the locations of the corners. The results of the evaluation may be compared to the results of similar evaluations at the various model complexities to determine the model complexity with the best score (i.e., the lowest error), and thus the optimal estimated model.

In some embodiments, for each model complexity, cross validation may be performed multiple times. For example, the model estimation and evaluation may be run multiple times at each model complexity, with different data points being set aside on each iteration at each model complexity to be used for evaluating the estimated model. The results of all the iterations at a particular model complexity may be combined into one quality measure for that model complexity. This can be performed for each model complexity, and the results for each model complexity can then be compared to find the particular model complexity that that gives the overall best score (i.e., the lowest error), and thus the optimal estimated model.

Figure 14:
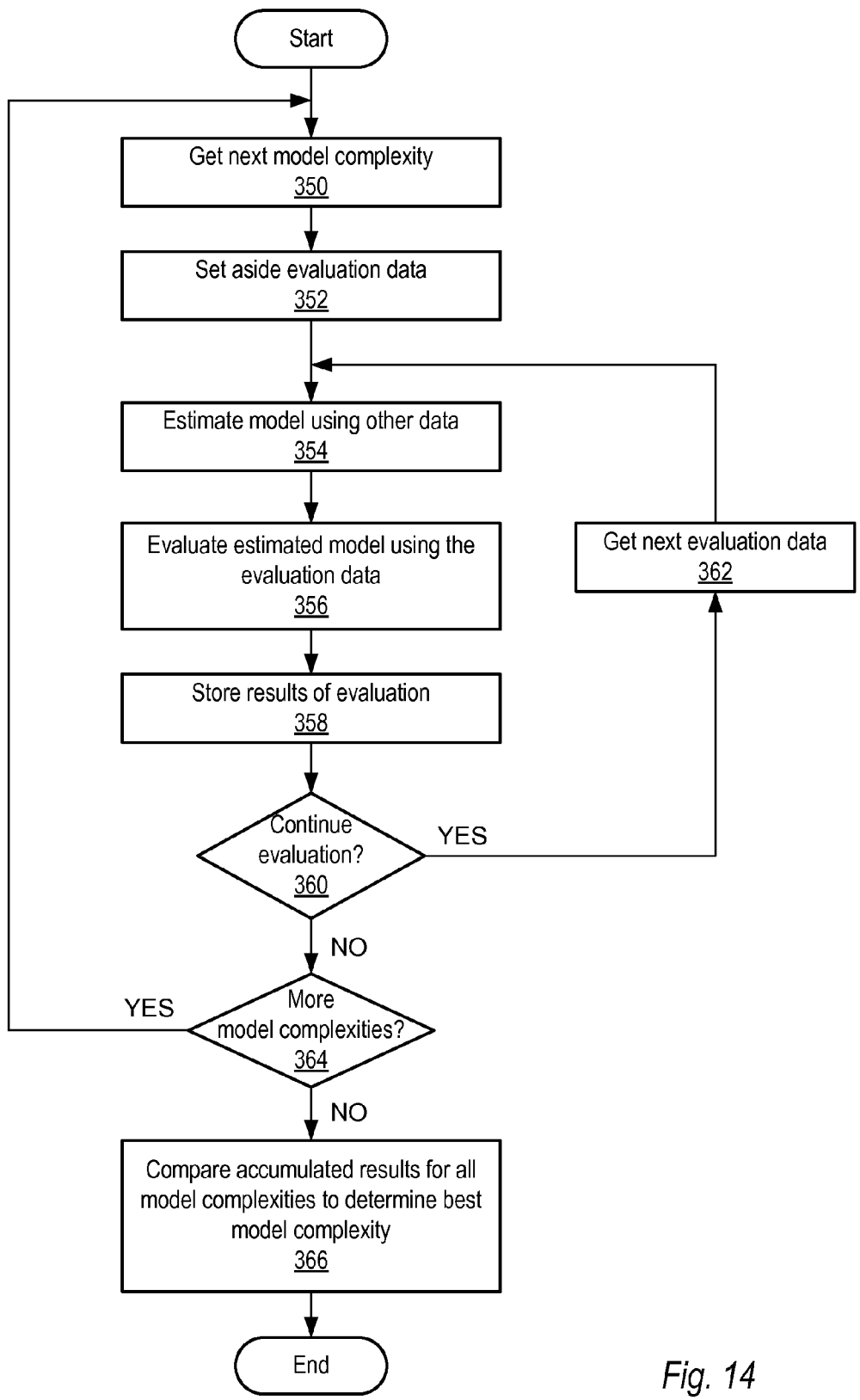
FIG. 14 is a flowchart of a method for automatically determining a model complexity for a camera model (e.g., for the geometric distortion model) according to some embodiments.

FIG. 14 is a flowchart of a method for automatically determining a model complexity for a camera model (e.g., for the geometric distortion model) according to some embodiments. As indicated at 350, a model complexity may be obtained. Some embodiments may start at the simplest model complexity; however, other embodiments may start at other complexities. As indicated at 352, a portion of the data may be set aside as evaluation data. As indicated at 354, an estimated model may be generated using the other data. As indicated at 356, the estimated model may be applied to the evaluation data to generate a score for the estimated model (and for the respective model complexity). As indicated at 358, the results of the evaluation may be stored (or accumulated, if this is not the first run at this model complexity). As indicated at 360, a test may be made to see if the evaluation of this model complexity is to continue. For example, some embodiments may specify a maximum number of iterations to be performed at each model complexity. At 360, if evaluation of this model complexity is to be continued, the method goes to 362, and a new set of evaluation data is obtained. The method then returns to 354 to repeat 354 through 360. At 360, if evaluation of this model complexity is done, then at 364, a check is done to see if there are more model complexities to be evaluated. If, at 364, there are more model complexities to be evaluated, then the method returns to 350, and 350 through 364 are repeated for the next model complexity. If, at 364, there are no more model complexities to be evaluated, then the method proceeds to 366, where the accumulated results for all model complexities are compared to determine the optimal model complexity.

The principal point may be defined as the location of an image on an image plane formed by the direct optical axial ray passing through the perspective center of the lens. In some embodiments, the lens profiling module may automatically select whether to fix the principal point at the image center or estimate the location of the principal point. This may provide additional robustness to the estimation of the camera model parameters, for example for telephoto lenses where there may not be enough variation in the captured images to accurately estimate the principal point.

Sensor pixels may be square or not square. Thus, in some embodiments, in addition to the automatic determination of an optimal model complexity for the models based on the number of parameters, the automatic process may similarly test models that use square or non-square pixels to determine whether square or non-square pixel is better. Other camera or model parameters may be similarly automatically tested for models in some embodiments.

In some embodiments, the automatic method of determining model complexity may be performed on the geometric distortion model to determine an optimal model complexity. The model complexity determined for the geometric distortion model may then be applied to the chromatic aberration model. The model complexity for the vignette model may be performed separately, however, using a similar method.

Example Camera Model

The following describes an example camera model that may be used in some embodiments of the lens profiling module, and is not intended to be limiting. The example camera model characterizes the most common form of lens aberrations, namely the geometric distortion (both radial and tangential distortions), the lateral chromatic aberration and the radial light falloff from the principal point (the vignetting), for various lens types including, but not limited to, rectilinear, wide-angle, and fisheye lenses. Note that, in some embodiments, other types of aberrations may be characterized in the camera model.

Principal Point

The principal point may be defined as the location of an image on an image plane formed by the direct optical axial ray passing through the perspective center of the lens. In some embodiments, the principal point may be fixed at the image center. In other embodiments, the location of the principal point may be estimated during model estimation. Some embodiments may automatically determine whether to estimate the location of the principal point during model estimation or fix the principal point at the image center for an image. This may provide additional robustness to the estimation of the camera model parameters, for example for telephoto lenses where there may not be enough variation in the captured images to accurately estimate the principal point.

Geometric Distortion Model for Rectilinear Lenses

Figure 15:
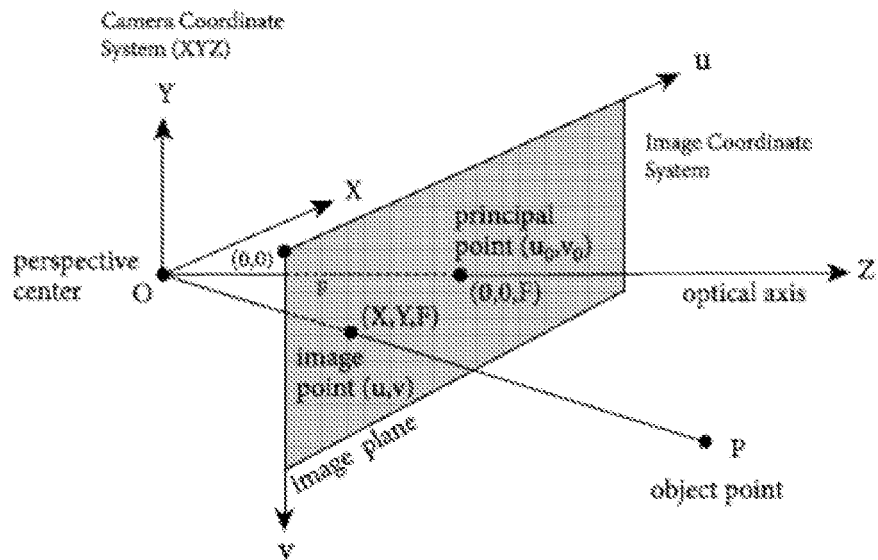
FIG. 15 illustrates an example pinhole camera model.

Before explaining the geometric distortion model for rectilinear lenses, some notations are introduced. FIG. 15 illustrates an example pinhole camera model. The image plane is setup at one focal length F distance away from the camera coordinate system's XY plane. The object point P in the camera coordinate system is projected onto the image plane with the emanating light ray passing through the camera's perspective center O. The resulting image point is referenced as point (u,v) in the image coordinate system, or equivalently as point (X, Y, F) in the camera coordinate system. Typically, the (u,v) coordinates are denoted in the number of pixels, whereas the (X, Y, Z) coordinates are represented in a real world physical unit such as millimeters.

Let F be the focal length in millimeters. Let $s_x$ and $s_y$ denote the width and height of the sensor pixels measured in the number of pixels per millimeter. Let $f_c = s_x F$ and $f_y = s_y F$, which are the focal lengths expressed in the number of X and Y pixels respectively. Note that when the individual pixels on the sensor are not square, the two focal lengths $f_x$ and $f_y$ will be different.

In the pinhole camera model, all points along the ray from the perspective center O towards the object point P share the same image point (X, Y, F). The projective mapping of the object points along a ray may thus be uniquely represented using the homogenous coordinates (x, y, 1) of the image point (X, Y, F), where x=X/F, and y=Y/F. The point (x,y) may be considered as the ideal image point location before the lens distortion is introduced. Let $(x_d, y_d)$ be the distorted image point after the lens distortion, which is the actual point observed on the image. The geometric distortion model for the rectilinear lenses can be formulated as follows:

$$\begin{bmatrix} x_d \\ y_d \end{bmatrix} = \begin{bmatrix} (1 + k_1 r^2 + k_2 r^4 + k_3 r^6) x + 2(k_4 y + k_5 x) x + k_5 r^2 \\ (1 + k_1 r^2 + k_2 r^4 + k_3 r^6) y + 2(k_4 y + k_5 x) y + k_4 r^2 \end{bmatrix}$$

where $r^2 = x^2 + y^2$ and $k_1$, $k_2$, $k_3$ are parameters for the radial distortion and $k_4$, $k_3$ are parameters for the tangential distortion.

Equivalently, the model can also be re-written in the image coordinate system as in the following equations:

$$\begin{bmatrix} x_d \\ y_d \end{bmatrix} = \begin{bmatrix} (u_d - u_0)/f_x \\ (v_d - v_0)/f_y \end{bmatrix}$$

$$\begin{bmatrix} x \\ y \end{bmatrix} = \begin{bmatrix} (u - u_0)/f_x \\ (v - v_0)/f_y \end{bmatrix}$$

$$\begin{bmatrix} u_d \\ v_d \end{bmatrix} = \begin{bmatrix} u + f_x[(k_1 r^2 + k_2 r^4 + k_3 r^6) x + 2(k_4 y + k_5 x) x + k_5 r^2] \\ v + f_x[(k_1 r^2 + k_2 r^4 + k_3 r^6) y + 2(k_4 y + k_5 x) y + k_4 r^2] \end{bmatrix}$$

As part of the rectilinear lens model calibration process, $\{u_0, k_2, k_3, k_4, k_5\}$ are the set of model parameters that need to be estimated, in some embodiments.

Geometric Distortion Model for Fisheye Lenses

Figure 16:
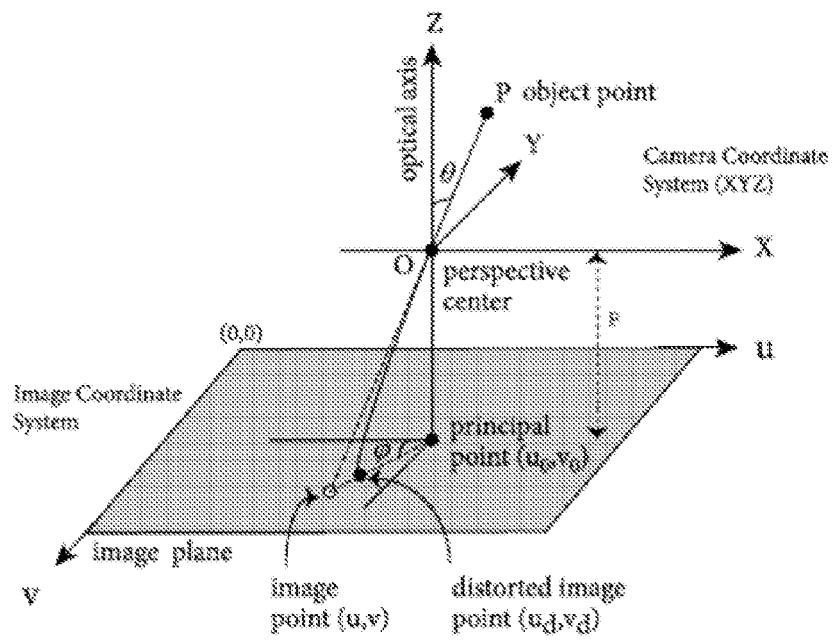
FIG. 16 illustrates an example camera model for a fisheye lens.

FIG. 16 illustrates an example camera model for a fisheye lens. The image plane is set up at one focal length F distance away from the camera coordinate system's XY plane. The object point P in the camera coordinate system is projected onto the image plane with the light ray passing through the camera's perspective center O. The incident angle of the incoming ray with the Z-axis is denoted as θ. In the pinhole camera case, the ideal image point would be at (u,v) in the image coordinate system. However, because of the radial distortion of the fisheye lens, the distorted image point is actually observed at $(u_d, v_d)$. Let r and $r_d$ be the respective radial distances of the ideal and the distorted image points to the principal point, in the camera coordinate system. The fisheye geometric distortion model can then be formulated as follows:

$$r_d = f \cdot (\theta + k_1 \theta^3 + k_2 \theta^5)$$

where θ=arctan(r/f) and $k_1$, $k_2$ are fisheye camera model parameters. It is possible to include higher order polynomial terms as part of the approximation. An approximation up to the 5th order term for θ may be accurate enough for most applications.

Equivalently, the model can also be re-written in the image coordinate system as in the following equation:

$$\begin{bmatrix} u_d \\ v_d \end{bmatrix} = \frac{1}{r}(\theta + k_1 \theta^3 + k_2 \theta^5) \begin{bmatrix} f_x \cdot \Delta u \\ f_y \cdot \Delta v \end{bmatrix} + \begin{bmatrix} u_0 \\ v_0 \end{bmatrix}$$

where $$\begin{bmatrix} \Delta u \\ \Delta v \end{bmatrix} = \begin{bmatrix} u - u_0 \\ v - v_0 \end{bmatrix},$$

θ=arctan(r/f), $r = \sqrt{\Delta u^2 + \Delta v^2}$, and $f = \sqrt{f_x f_y}$

The formulation assumes re-sampling the output corrected image with a uniform square pixel size s=f/F.

As part of the fisheye lens model calibration process, $\{u_0, v_0, f_x, f_y, k_1, k_2\}$ are the set of model parameters that need to be estimated, in some embodiments.

Lateral Chromatic Aberration Model

In color photography, the chromatic aberration describes the phenomenon of a lens failing to focus all colors of an object point to the same point on the image plane. It occurs because lenses have different refractive indices for different wavelengths of light, giving the appearance of color "fringes" of along object boundaries.

Chromatic aberration can be both longitudinal, in that different wavelengths are focused at a different distance along the optical axis, causing different levels of blurring for different colors; and lateral, in that different wavelengths are magnified differently within the image plane that is perpendicular to the optical axis. The problem of chromatic aberration becomes more visible as the digital camera sensor becomes higher resolution.

Without the loss of generality, a lateral chromatic aberration model may be described in the context of three-color RGB image sensors. The model can easily be extended to other multi-color image sensors.

The lateral chromatic aberration model for RGB image sensors may contain three parts. First, there is description of the geometric distortion model for a reference color channel. In this case, the Green color channel may be chosen as the reference color channel. This geometric distortion model can take on the form of the geometric model for the rectilinear lens or the fisheye lens, depending on the type of lens used. There are descriptions of two differential geometric distortion models for both the Red and the Blue color channels relative to the Green reference color channel. The differential geometric model takes into account the additional parameters for scaling, radial and tangential distortions.

Let $(x_d, y_d)$, $(x_d^R, y_d^R)$, and $(x_d^B, y_d^B)$ denote the respective coordinates of the distorted image points in the Green, Red and Blue color channels for the same object point P. The differential geometric distortion models may therefore be formulated as follows:

$$\begin{bmatrix} x_d^R \\ y_d^R \end{bmatrix} = \alpha_0 \begin{bmatrix} (1+\alpha_1 r_d^2 + \alpha_2 r_d^4 + \alpha_3 r_d^6)x_d + 2(\alpha_4 y_d + \alpha_5 x_d)x_d + \alpha_5 r_d^2 \\ (1+\alpha_1 r_d^2 + \alpha_2 r_d^4 + \alpha_3 r_d^6)y_d + 2(\alpha_4 y_d + \alpha_5 x_d)y_d + \alpha_4 r_d^2 \end{bmatrix}$$

$$\begin{bmatrix} x_d^B \\ y_d^B \end{bmatrix} = \beta_0 \begin{bmatrix} (1+\beta_1 r_d^2 + \beta_2 r_d^4 + \beta_3 r_d^6)x_d + 2(\beta_4 y_d + \beta_5 x_d)x_d + \beta_5 r_d^2 \\ (1+\beta_1 r_d^2 + \beta_2 r_d^4 + \beta_3 r_d^6)y_d + 2(\beta_4 y_d + \beta_5 x_d)y_d + \beta_4 r_d^2 \end{bmatrix}$$

where $r_d^2 = x_d^2 + y_d^2$. The $\alpha_0, \alpha_1, \alpha_2, \alpha_3, \alpha_4, \alpha_5$ are differential model parameters for the Red-Green color shift. The $\beta_0, \beta_1, \beta_2, \beta_3, \beta_4, \beta_5$ are differential model parameters for the Blue-Green color shift.

Equivalently, the differential models can also be re-written in the image coordinate system as in the following equations:

$$\begin{bmatrix} u_d^R \\ v_d^R \end{bmatrix} = \begin{bmatrix} f_x \cdot x_d^R + u_0 \\ f_y \cdot y_d^R + v_0 \end{bmatrix}$$

$$\begin{bmatrix} u_d^B \\ v_d^B \end{bmatrix} = \begin{bmatrix} f_x \cdot x_d^B + u_0 \\ f_y \cdot y_d^B + v_0 \end{bmatrix}$$

As part of the lateral chromatic aberration model calibration process, the geometric distortion model for the Green reference color channel may need to be estimated, in some embodiments. In addition, the two sets of Red/Green and Blue/Green differential model parameters $\alpha_0, \alpha_1, \alpha_2, \alpha_3, \alpha_4, \alpha_5$ and $\beta_0, \beta_1, \beta_2, \beta_3, \beta_4, \beta_5$ also may be estimated.

Vignette Model

The vignette model characterizes the radial falloff of the sensor response from the principal point. Let $I(x_d, y_d)$ and $I_{ideal}(x_d, y_d)$ be the observed and the ideal (or vignette corrected) raw sensor values at the distorted image point. The raw sensor values are assumed to be linearly proportional to the radiance incident upon the image point, i.e. assuming a linear camera sensor response curve. The vignette function may be expressed as a polynomial radial loss function:

$$L(x_d, y_d) = 1 + \alpha_1 r_d^2 + \alpha_2 r_d^4 + \alpha_3 r_d^6$$

$$I(x_d, y_d) = I_{ideal}(x_d, y_d) \cdot L(x_d, y_d)$$

where:

$$r_d^2 x_d^2 + y_d$$

and:

$$\begin{bmatrix} x_d \\ y_d \end{bmatrix} = \begin{bmatrix} (u_d - u_0)/f_x \\ (v_d - v_0)/f_y \end{bmatrix}$$

Equivalently, the vignette function can be approximated as a polynomial radial gain function, which might be more preferable in the numeric computation for the vignette correction, because it avoids possible division by zero problems:

$$G(x_d, y_d) \approx 1 - \alpha_1 r_d^2 + (\alpha_1^2 - \alpha_2) r_d^4 - (\alpha_1^3 - 2\alpha_1\alpha_2 + \alpha_3) r_d^6 + (\alpha_1^4 + \alpha_2^2 + 2\alpha_1\alpha_3 + 3\alpha_1^2\alpha_2) r_d^8 I_{ideal}(x_d, y_d) = I(x_d, y_d) \cdot G(x_d, y_d)$$

As part of the vignette model calibration process, $\{u_0, v_0, f_x, f_y, a_1, a_2, a_3\}$ are the set of model parameters that need to be estimated, in some embodiments. In some embodiments, these model parameters are identical for all color channels.

In some embodiments, when estimating the vignette model for camera raw images, the vignette model estimation may be based on the raw linear sensor color image data instead of on the gamma corrected and color transformed image data. This may generate a more accurate vignette model estimate because it eliminates the need to estimate the sensor response curves and the gamma correction coefficients.

Example Lens Profile File Format

An example lens profile file format is described that may contain the camera model description for a specific camera body and lens combination, and that may be used in some embodiments. The lens profile may, for example, be read by image processing applications to direct the applications in applying the lens correction models to an input image.

In some embodiments, lens profile files may be encoded in a standard format, such as the standard Adobe® Extensible Metadata Platform (XMP) file format. This XML based file format can be read/written using Adobe's open-sourced XMPCore® Toolkit technology. In other embodiments, lens profile files may be encoded in other standard formats, or in non-standard or custom formats.

A lens profile file may be designed to be a general container for a list of lens sub-profiles. However, some applications may require that all sub-profiles in a lens profile file must be for the same camera body and lens model combination. In some embodiments, the lens profiling module may ensure that all sub-profiles in a lens profile file are generated from the same type of source image file format (e.g., DNG, JPEG), in the same color mode (e.g., RGB or grayscale), with the same image pixel bit depths, and with the same camera model type (rectilinear or fisheye lens model). Other camera settings such as focal length, aperture and focus distance may change from one sub-profile to another in a lens profile file. The additional file format constraints may simplify the interpolation of the lens profile among the multiple sub-profiles within a lens profile file for new, previously un-observed camera settings. In some embodiments, the lens profile file format does not dictate how the interpolation should be done; this is left up to the lens correction program.

In some embodiments, each sub-profile has a metadata descriptor and one or more descriptors that define the geometric distortion, the lateral chromatic aberration and the vignette models. In some embodiments, all three model descriptors are not required to be present; a minimum of one model descriptor may be required, however. The following sections describe example contents for each part.

Profile Metadata Descriptors

The following is an example list of metadata descriptors, according to some embodiments. The lens profile metadata descriptors may, for example, be used in automatic lens profile matching and to aid user selection. The property name and a brief description is given for each property. Some or all of these properties may be required; others may be optional. In some embodiments, some or all of these properties may be populated from the metadata (e.g., EXIF/XMP metadata) of the set of calibration images (also called the reference image set) that are used to create the lens profiles.

stCamera:Author—Creator credit information.
stCamera:Make—Camera make. EXIF Make tag value.
stCamera:Model—Camera model. EXIF Model tag value.
stCamera:UniqueCameraModel—Unique locale independent camera model. DNG UniqueCameraModel tag value.
stCamera:CameraPrettyName—Display name for the camera body as specified by the profile creator.
stCamera:Lens—Lens model information. DNG Lens tag value.

stCamera:LensInfo—Lens information that describes the min/max focal lengths and f-numbers. DNG LensInfo tag value.

stCamera:LensID—Lens ID information. DNG LensID tag value.

stCamera:LensPrettyName—Display name for the lens as specified by the profile creator.

stCamera:ImageWidth—Reference image width in number of pixels. EXIF ImageWidth tag value.

stCamera:ImageLength—Reference image height in number of pixels. EXIF ImageLength tag value.

stCamera:Xresolution—Reference image X-resolution in DPI. EXIF XResolution tag value.

stCamera:Yresolution—Reference image Y-resolution in DPI. EXIF YResolution tag value.

stCamera:ApertureValue—Aperture value in the APEX unit. EXIF ApertureValue tag value.

stCamera:CameraRawProfile—True if the profile is created from or for camera raw images. False if the profile is created from JPEG or TIFF images.

stCamera:FocusDistance—Average focus distance in meters of the reference image set.

stCamera:SensorFormatFactor—Sensor format factor of the reference camera. If absent, default to match all camera sensor sizes.

Rectilinear Geometric Distortion Model Descriptors

The following is an example list of rectilinear geometric distortion model descriptors, according to some embodiments. These descriptors define the geometric distortion model parameters for the rectilinear lens. Dmax represents the maximum of the reference image width or height in the number of pixels. The property name and a brief description is given for each property. Some or all of these properties may be required; others may be optional.

stCamera:PerspectiveModel—Element that defines the rectilinear lens geometric distortion model.

stCamera:Version—Model version number.

stCamera:FocalLengthX—$f_x/D_{max}$. If absent, default to stCamera:FocalLength in millimeters. May need to be multiplied by the $D_{max}$ of the target image when applying the model for lens correction.

stCamera:FocalLengthY—$f_y/D_{max}$. If absent, default to stCamera:FocalLength in millimeters. May need to be multiplied by the $D_{max}$ of the target image when applying the model for lens correction.

stCamera:ImageXCenter—$u_0/D_{max}$. If absent, default to 0.5. May need to be multiplied by the $D_{max}$ of the target image when applying the model for lens correction.

stCamera:ImageYCenter—$v_0/D_{max}$. If absent, default to 0.5. May need to be multiplied by the $D_{max}$ of the target image when applying the model for lens correction.

stCamera:ScaleFactor—Scale factor. If absent, default to 1.0.

stCamera:RadialDistortParam1—$k_1$ (required).

stCamera:RadialDistortParam2—$k_2$. Required if $k_3$ is present.

stCamera:RadialDistortParam3—$k_3$.

stCamera:TangentialDistortParam1—$k_4$.

stCamera:TangentialDistortParam2—$k_5$.

stCamera:ResidualMeanError—Expected relative model prediction error per pixel.

stCamera:ResidualStandardDeviation—Expected standard deviation of the relative model prediction error.

Fisheye Geometric Distortion Model Descriptors

The following is an example list of fisheye geometric distortion model descriptors, according to some embodiments. These descriptors define the geometric distortion model parameters for the fisheye lens. Dmax represents the maximum of the reference image width or height in the number of pixels. The property name and a brief description is given for each property. Some or all of these properties may be required; others may be optional.

stCamera:FisheyeModel—Element that defines the fisheye lens geometric distortion model.

stCamera:Version—Model version number.

stCamera:FocalLengthX—$f_x/D_{max}$. If absent, default to stCamera:FocalLength in millimeters. Need to be multiplied by the $D_{max}$ of the target image when applying the model for lens correction.

stCamera:FocalLengthY—$f_y/D_{max}$. If absent, default to stCamera:FocalLength in millimeters. Need to be multiplied by the $D_{max}$ of the target image when applying the model for lens correction.

stCamera:ImageXCenter—$u_0/D_{max}$. If absent, default to 0.5. Need to be multiplied by the $D_{max}$ of the target image when applying the model for lens correction.

stCamera:ImageYCenter—$v_0/D_{max}$. If absent, default to 0.5. Need to be multiplied by the $D_{max}$ of the target image when applying the model for lens correction.

stCamera:RadialDistortParam1—$k_1$. (Required).

stCamera:RadialDistortParam2—$k_2$.

stCamera:ResidualMeanError—Expected relative model prediction error per pixel.

stCamera:ResidualStandardDeviation—Expected standard deviation of the relative model prediction error.

Lateral Chromatic Aberration Model Descriptors

The following is an example list of lateral chromatic aberration model descriptors, according to some embodiments. These descriptors define the three components of the lateral chromatic aberration model for RGB color images. The property name and a brief description is given for each property. Some or all of these properties may be required; others may be optional.

stCamera:ChromaticGreenModel—Element that defines the geometric distortion model of the reference Green color channel. The definition could be either for the rectilinear or for the fisheye lens.

stCamera:ChromaticRedGreenModel—Element that defines the differential geometric distortion model that characterize the Red/Green color fringe. It shares the same set of descriptors as the rectilinear geometric distortion model, but the stCamera:ScaleFactor property ($a_0$) is required.

stCamera:ChromaticBlueGreenModel—Element that defines the differential geometric distortion model that characterize the Blue/Green color fringe. It shares the same set of descriptors as the rectilinear geometric distortion model, but the stCamera:ScaleFactor property ($\beta_0$) is required.

Vignette Model Descriptors

The following is an example list of vignette model descriptors, according to some embodiments. These descriptors define the vignette model parameters. Let Dmax be the maximum of the reference image width or height in the number of pixels. The property name and a brief description is given for each property. Some or all of these properties may be required; others may be optional.

stCamera:FocalLengthX—$f_x/D_{max}$. If absent, default to stCamera:FocalLength in millimeters. Need to be multiplied by the $D_{max}$ of the target image when applying the model for lens correction.

stCamera:FocalLengthY—$f_y/D_{max}$. If absent, default to stCamera:FocalLength in millimeters. Need to be multiplied by the $D_{max}$ of the target image when applying the model for lens correction.

stCamera:ImageXCenter—$u_0/D_{max}$. If absent, default to 0.5. Need to be multiplied by the $D_{max}$ of the target image when applying the model for lens correction.

stCamera:ImageYCenter—$v_0/D_{max}$. If absent, default to 0.5. Need to be multiplied by the $D_{max}$ of the target image when applying the model for lens correction.

stCamera:VignetteModelParam1—$\alpha_1$.

stCamera:VignetteModelParam2—$\alpha_2$. Required if $\alpha_3$ is present.

stCamera:VignetteModelParam3—$\alpha_3$.

stCamera:ResidualMeanError—Expected percentage model prediction error.

Lens Profiling Module Implementations

Figure 17:
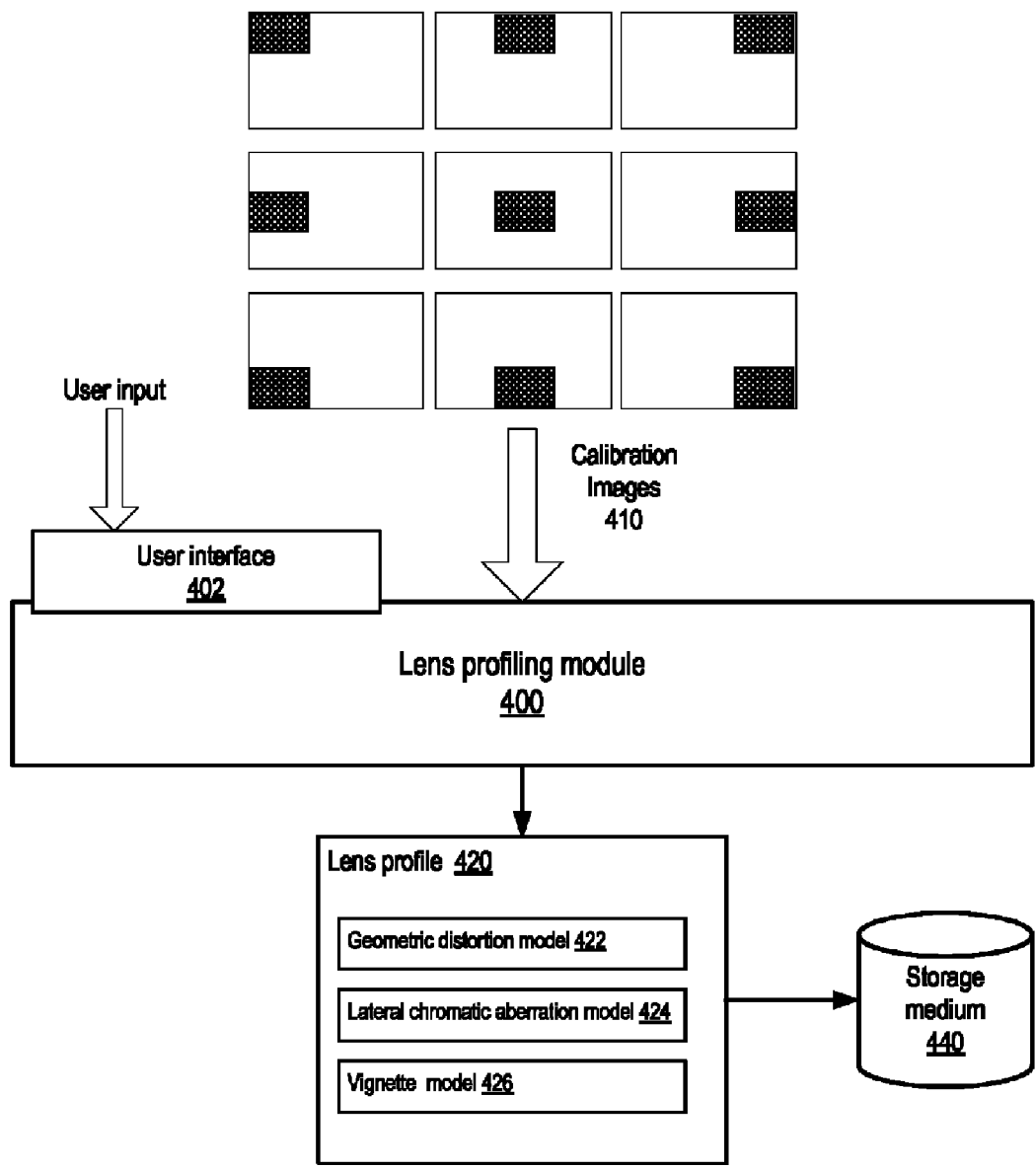
FIG. 17 illustrates a lens profiling module, according to some embodiments.

FIG. 17 illustrates a general, high-level architecture for the lens profiling module, according to some embodiments. Unlike conventional camera calibration processes, embodiments of the lens profiling module may estimate two or more models for correcting aberrations in images captured with a camera/lens combination in a single pass from a set of captured calibration images. For example, some embodiments may estimate a geometric distortion model, a lateral chromatic aberration model, and a vignette model in a single pass. Lens profiling module 400 receives a set of calibration images 410. Lens profiling module 400 may determine point correspondences, 3D transformations, and camera intrinsics (e.g., image center, focal length, distortion parameters, etc.) for the calibration grids in the images 410. In some embodiments, the lens profiling module may detect grid corners in the checkerboard pattern of the calibration grid in each image, and use this corner information in determining the point correspondences, 3D transformations, and camera intrinsics. Lens profiling module 400 estimates models for two or more types of aberrations (e.g., geometric distortion, lateral chromatic aberration, and vignetting) from the calibration grid information determined from the images. Some embodiments of the lens profiling module 400 may be configured to automatically determine an optimal model complexity, as previously described, when estimating the models. The estimated models may be output to a lens profile 420. For example, in some embodiments, the estimated models may be written in a lens profile format to a new lens profile file, or appended to an existing lens profile file for the camera/lens combination. The lens profiling module 400 may perform the above for one or more other sets of calibration images for the camera/lens combination, and the estimated models may be appended to the lens profile 420.

Some embodiments of the lens profiling module 400 may automatically tag the generated lens profile 420 with camera/lens metadata (e.g., EXIF metadata) obtained from at least one of the calibration images 410. This may, for example, allow applications that use the lens profiles 420 to easily and automatically locate a correct lens profile for an image to be processed by comparing the metadata from the image to the metadata tagged into the lens profile.

Example System

Figure 18:
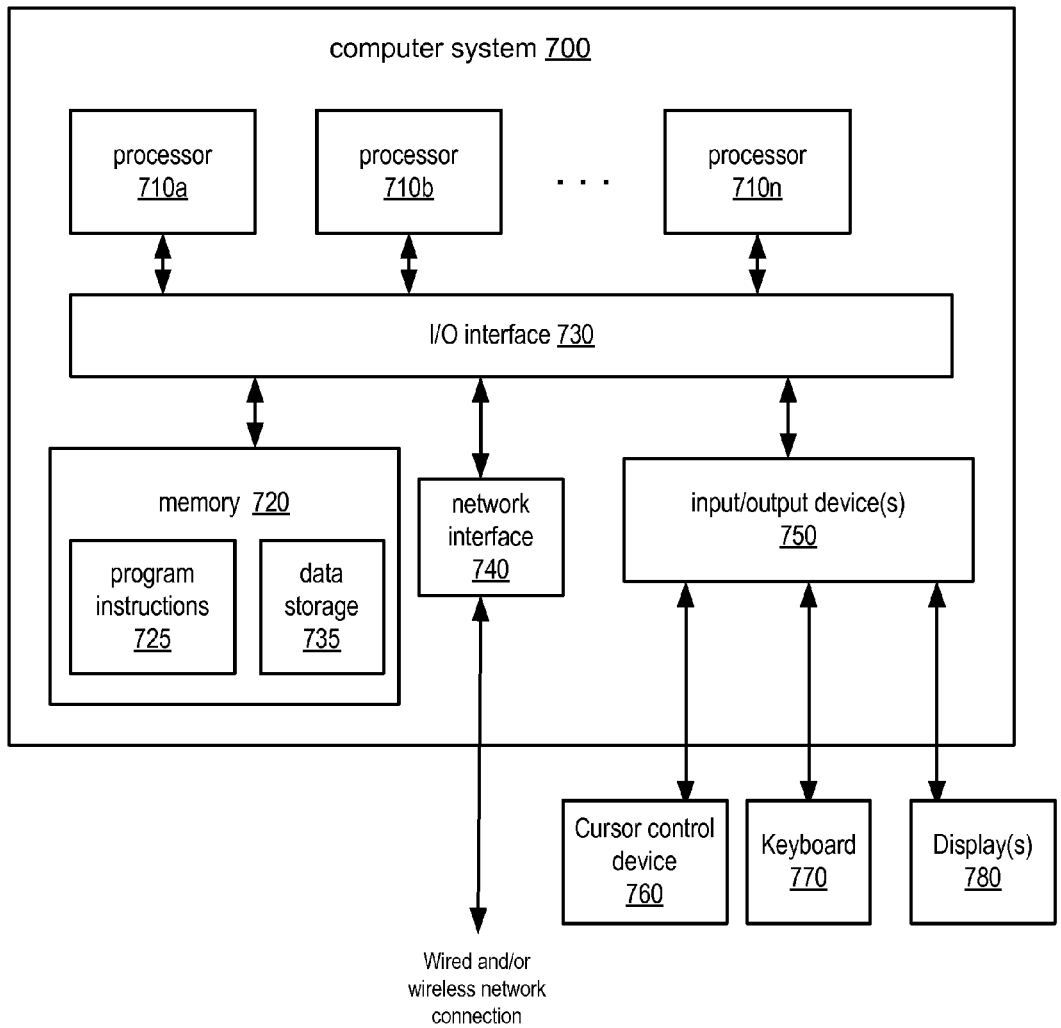
FIG. 18 illustrates an example computer system that may be used in embodiments.

Various components of embodiments of a lens profiling module may be executed on one or more computer systems, which may interact with various other devices. One such computer system is illustrated by FIG. 18. In the illustrated embodiment, computer system 700 includes one or more processors 710 coupled to a system memory 720 via an input/output (I/O) interface 730. Computer system 700 further includes a network interface 740 coupled to I/O interface 730, and one or more input/output devices 750, such as cursor control device 760, keyboard 770, audio device 790, and display(s) 780. In some embodiments, it is contemplated that embodiments may be implemented using a single instance of computer system 700, while in other embodiments multiple such systems, or multiple nodes making up computer system 700, may be configured to host different portions or instances of embodiments. For example, in some embodiments, some elements may be implemented via one or more nodes of computer system 700 that are distinct from those nodes implementing other elements. In some embodiments, computer system 700 may be a digital camera.

In various embodiments, computer system 700 may be a uniprocessor system including one processor 710, or a multiprocessor system including several processors 710 (e.g., two, four, eight, or another suitable number). Processors 710 may be any suitable processor capable of executing instructions. For example, in various embodiments, processors 710 may be general-purpose or embedded processors implementing any of a variety of instruction set architectures (ISAs), such as the x86, PowerPC, SPARC, or MIPS ISAs, or any other suitable ISA. In multiprocessor systems, each of processors 710 may commonly, but not necessarily, implement the same ISA.

In some embodiments, at least one processor 710 may be a graphics processing unit. A graphics processing unit or GPU may be considered a dedicated graphics-rendering device for a personal computer, workstation, game console or other computer system. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, the methods disclosed herein for camera calibration based on multiview image geometry may be implemented by program instructions configured for execution on one of, or parallel execution on two or more of, such GPUs. The GPU(s) may implement one or more application programmer interfaces (APIs) that permit programmers to invoke the functionality of the GPU(s). Suitable GPUs may be commercially available from vendors such as NVIDIA Corporation, ATI Technologies, and others.

System memory 720 may be configured to store program instructions and/or data accessible by processor 710. In various embodiments, system memory 720 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above for a lens profiling module, are shown stored within system memory 720 as program instructions 725 and data storage 735, respectively. In other embodiments, program instructions and/or data may be received, sent or stored upon different types of computer-accessible media or on similar media separate from system memory 720 or computer system 700. Generally speaking, a computer-accessible medium may include storage media or memory media such as magnetic or optical media, e.g., disk or CD/DVD-ROM coupled to computer system 700 via I/O interface 730. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 740.

In some embodiments, I/O interface 730 may be configured to coordinate I/O traffic between processor 710, system memory 720, and any peripheral devices in the device, including network interface 740 or other peripheral interfaces, such as input/output devices 750. In some embodiments, I/O interface 730 may perform any necessary protocol, timing or other data transformations to convert data signals from one component (e.g., system memory 720) into a format suitable for use by another component (e.g., processor 710). In some embodiments, I/O interface 730 may include support for devices attached through various types of peripheral buses, such as a variant of the Peripheral Component Interconnect (PCI) bus standard or the Universal Serial Bus (USB) standard, for example. In some embodiments, the function of I/O interface 730 may be split into two or more separate components, such as a north bridge and a south bridge, for example. In addition, in some embodiments some or all of the functionality of I/O interface 730, such as an interface to system memory 720, may be incorporated directly into processor 710.

Network interface 740 may be configured to allow data to be exchanged between computer system 700 and other devices attached to a network, such as other computer systems, or between nodes of computer system 700. In various embodiments, network interface 740 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 750 may, in some embodiments, include one or more display terminals, keyboards, keypads, touchpads, scanning devices, voice or optical recognition devices, or any other devices suitable for entering or retrieving data by one or more computer system 700. Multiple input/output devices 750 may be present in computer system 700 or may be distributed on various nodes of computer system 700. In some embodiments, similar input/output devices may be separate from computer system 700 and may interact with one or more nodes of computer system 700 through a wired or wireless connection, such as over network interface 740.

As shown in FIG. 18, memory 720 may include program instructions 725, configured to implement embodiments of a lens profiling module as described herein, and data storage 735, comprising various data accessible by program instructions 725. In some embodiments, program instructions 725 may include software elements of a lens profiling module as illustrated in the above Figures. Data storage 735 may include data that may be used in embodiments. In other embodiments, other or different software elements and data may be included.

Those skilled in the art will appreciate that computer system 700 is merely illustrative and is not intended to limit the scope of a lens profiling module as described herein. In particular, the computer system and devices may include any combination of hardware or software that can perform the indicated functions, including computers, network devices, internet appliances, PDAs, wireless phones, pagers, etc. Computer system 700 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 700 may be transmitted to computer system 700 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent examples of embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:
1. A computer-implemented method, comprising:
obtaining a plurality of calibration images, wherein each calibration image is captured with a particular camera/lens combination, wherein each calibration image is captured to include a view of a calibration chart that covers only a portion of an image frame of the respective calibration image, wherein the view of the calibration chart covers a different area of the image frame in at least two of the calibration images;
determining calibration information for the particular camera/lens combination according to the views of the cali- bration chart in the different areas of the image frame in the at least two of the calibration images;

estimating a mathematical model of each of two or more aberrations of the particular camera/lens combination according to the calibration information for the particular camera/lens combination; and outputting the mathematical models of the two or more aberrations of the particular camera/lens combination.

2. The computer-implemented method as recited in claim 1, wherein the two or more aberrations include geometric distortion, lateral chromatic aberration, and vignette, and wherein the mathematical models include a geometric distortion model, a lateral chromatic aberration model, and a vignette model.

3. The computer-implemented method as recited in claim 1, wherein the calibration information includes point correspondences, three-dimensional (3D) transformations, and camera intrinsics.

4. The computer-implemented method as recited in claim 1, wherein said determining calibration information for the particular camera/lens combination according to the views of the calibration chart in the calibration images comprises:

detecting reference points in the views of the calibration chart in the calibration images; and determining calibration information for the views of the calibration chart in the calibration images according to the detected reference points.

5. The computer-implemented method as recited in claim 1, wherein the calibration chart is a checkerboard pattern.

6. The computer-implemented method as recited in claim 1, wherein the two or more aberrations include vignette, and wherein said estimating a mathematical model of vignette for the particular camera/lens combination comprises:

establishing point correspondences for data points in white regions of the views of the calibration chart; and estimating the mathematical model of vignette for the camera/lens combination from the data points in the white regions of the views of the calibration chart.

7. The computer-implemented method as recited in claim 6, wherein said establishing point correspondences for data points in white regions of the views of the calibration chart comprises:

detecting reference points in the views of the calibration chart in the calibration images;

projecting reference points from an ideal calibration chart onto the views of the calibration chart according to a mathematical model of geometric distortion for the camera/lens combination;

determining errors between the projected reference points from the ideal calibration chart and the detected reference points in the views of the calibration chart; and interpolating according to the determined errors to estimate the data points in the white regions of the views of the calibration chart.

8. The computer-implemented method as recited in claim 1, wherein said estimating a mathematical model of each of two or more aberrations of the particular camera/lens combination according to the calibration information comprises, for each aberration:

estimating the mathematical model at two or more levels of complexity, wherein, at each level of complexity, the respective mathematical model is evaluated by applying the mathematical model to evaluation data; and comparing results of the evaluations of the mathematical models at the two or more levels of complexity to determine an optimal mathematical model of the aberration for the camera/lens combination.

9. The computer-implemented method as recited in claim 8, wherein said estimating the mathematical model at two or more levels of complexity comprises, for each level of complexity:

for each of two or more different sets of evaluation data:

estimating the mathematical model according to a set of data not including the current set of evaluation data;

evaluating the mathematical model by applying the mathematical model to the current set of evaluation data; and accumulating results of said evaluating the mathematical model.

10. The computer-implemented method as recited in claim 1, wherein said outputting the mathematical models of the two or more aberrations of the particular camera/lens combination comprises writing or appending the mathematical models to a lens profile for the particular camera/lens combination.

11. A system, comprising:

at least one processor; and a memory comprising program instructions, wherein the program instructions are executable by the at least one processor to:

obtain a plurality of calibration images, wherein each calibration image is captured with a particular camera/lens combination, wherein each calibration image is captured to include a view of a calibration chart that covers only a portion of an image frame of the respective calibration image, wherein the view of the calibration chart covers a different area of the image frame in at least two of the calibration images;

determine calibration information for the particular camera/lens combination according to the views of the calibration chart in the different areas of the image frame in the at least two of the calibration images;

estimate a mathematical model of each of two or more aberrations of the camera/lens combination according to the calibration information for the particular camera/lens combination; and output the mathematical models of the two or more aberrations of the particular camera/lens combination.

12. The system as recited in claim 11, wherein the two or more aberrations include geometric distortion, lateral chromatic aberration, and vignette, and wherein the mathematical models include a geometric distortion model, a lateral chromatic aberration model, and a vignette model.

13. The system as recited in claim 11, wherein the two or more aberrations include vignette, and wherein, to estimate a mathematical model of vignette for the particular camera/lens combination, the program instructions are executable by the at least one processor to:

establish point correspondences for data points in white regions of the views of the calibration chart; and estimate the mathematical model of vignette for the camera/lens combination from the data points in the white regions of the views of the calibration chart.

14. The system as recited in claim 11, wherein, to estimate a mathematical model of each of two or more aberrations of the particular camera/lens combination according to the calibration information, the program instructions are executable by the at least one processor to, for each aberration:

estimate the mathematical model at two or more levels of complexity, wherein, at each level of complexity, the respective mathematical model is evaluated by applying the mathematical model to evaluation data; and compare results of the evaluations of the mathematical models at the two or more levels of complexity to determine an optimal mathematical model of the aberration for the camera/lens combination.

15. The system as recited in claim 11, wherein, to output the mathematical models of the two or more aberrations of the particular camera/lens combination, the program instructions are executable by the at least one processor to write or append the mathematical models to a lens profile for the particular camera/lens combination.

16. A non-transitory computer-readable storage medium storing program instructions, wherein the program instructions are computer-executable to implement:
- obtaining a plurality of calibration images, wherein each calibration image is captured with a particular camera/lens combination, and wherein each calibration image is captured to include a view of a calibration chart that covers only a portion of an image frame of the respective calibration image, wherein the view of the calibration chart covers a different area of the image frame in at least two of the calibration images;
- determining calibration information for the particular camera/lens combination according to the views of the calibration chart in the different areas of the image frame in the at least two of the calibration images;
- estimating a mathematical model of each of two or more aberrations of the particular camera/lens combination according to the calibration information for the particular camera/lens combination; and
- outputting the mathematical models of the two or more aberrations of the particular camera/lens combination.

17. The non-transitory computer-readable storage medium as recited in claim 16, wherein the two or more aberrations include geometric distortion, lateral chromatic aberration, and vignette, and wherein the mathematical models include a geometric distortion model, a lateral chromatic aberration model, and a vignette model.

18. The non-transitory computer-readable storage medium as recited in claim 16, wherein the calibration information includes point correspondences, three-dimensional (3D) transformations, and camera intrinsics.

19. The non-transitory computer-readable storage medium as recited in claim 16, wherein the two or more aberrations include vignette, and wherein, in said estimating a mathematical model of vignette for the particular camera/lens combination, the program instructions are computer-executable to implement:
- establishing point correspondences for data points in white regions of the views of the calibration chart; and
- estimating the mathematical model of vignette for the camera/lens combination from the data points in the white regions of the views of the calibration chart;
- wherein said estimating the mathematical model of vignette is performed according to raw linear sensor color image data or according to gamma corrected and color transformed image data.

20. The non-transitory computer-readable storage medium as recited in claim 16, wherein, in said estimating a mathematical model of each of two or more aberrations of the particular camera/lens combination according to the calibration information, the program instructions are computer-executable to implement, for each aberration:
- estimating the mathematical model at two or more levels of complexity, wherein, at each level of complexity, the respective mathematical model is evaluated by applying the mathematical model to evaluation data; and
- comparing results of the evaluations of the mathematical models at the two or more levels of complexity to determine an optimal mathematical model of the aberration for the camera/lens combination.

* * * * *

UNITED STATES PATENT AND TRADEMARK OFFICE
CERTIFICATE OF CORRECTION

| | | |
|---|---|---|
| PATENT NO. | : 8,368,762 B1 | Page 1 of 1 |
| APPLICATION NO. | : 12/758655 | |
| DATED | : February 5, 2013 | |
| INVENTOR(S) | : Simon Su Chen et al. | |

It is certified that error appears in the above-identified patent and that said Letters Patent is hereby corrected as shown below:

On the Title page

On page 1, below ABSTRACT, line 2, insert a space between "...geometry." and "A", therefor.

On page 1, below ABSTRACT, line 17, delete "captured" and insert -- capture --, therefor.

Signed and Sealed this
Twenty-third Day of April, 2013

Teresa Stanek Rea
*Acting Director of the United States Patent and Trademark Office*